US012131696B2

(12) United States Patent
Lee et al.

(10) Patent No.: US 12,131,696 B2
(45) Date of Patent: Oct. 29, 2024

(54) DISPLAY DRIVING CIRCUIT, HOST, AND DISPLAY SYSTEM INCLUDING DISPLAY DRIVING CIRCUIT AND HOST

(71) Applicant: Samsung Electronics Co., Ltd., Suwon-si (KR)

(72) Inventors: Changju Lee, Suwon-si (KR); Kyounghwan Kwon, Suwon-si (KR); Junho Huh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/351,177

(22) Filed: Jul. 12, 2023

(65) Prior Publication Data

US 2024/0038157 A1 Feb. 1, 2024

(30) Foreign Application Priority Data

Jul. 27, 2022 (KR) ........................ 10-2022-0093432
Dec. 26, 2022 (KR) ........................ 10-2022-0184942

(51) Int. Cl.
*G09G 3/3225* (2016.01)
*G09G 3/3233* (2016.01)

(52) U.S. Cl.
CPC ....... *G09G 3/3225* (2013.01); *G09G 2310/08* (2013.01); *G09G 2320/0247* (2013.01); *G09G 2330/023* (2013.01)

(58) Field of Classification Search
None
See application file for complete search history.

(56) References Cited

U.S. PATENT DOCUMENTS 6,894,706 B1 * 5/2005 Ward ..................... G09G 5/005 345/428
7,158,163 B2 * 1/2007 Komiya ................... B41J 2/471 347/250
8,493,373 B2 7/2013 Jeon et al.
9,007,384 B2 * 4/2015 Brijesh ............. H04N 21/4305 345/520
9,514,713 B2 * 12/2016 Lee .......................... G09G 5/18
9,805,687 B2 10/2017 Han
(Continued)

FOREIGN PATENT DOCUMENTS

KR 10-1037559 B1 5/2011
KR 10-2389572 B1 4/2022

*Primary Examiner* — Sepehr Azari
(74) *Attorney, Agent, or Firm* — Harness, Dickey & Pierce, P.L.C.

(57) ABSTRACT

A display system includes a host configured to transfer image data respectively corresponding to a plurality of frames through a main channel, and to transfer a synchronization signal that synchronizes a clock signal of the host with a clock signal of the display driving circuit through an auxiliary channel, a display panel configured to display the image data, and a display driving circuit configured to generate control signals driving the display panel, based on the synchronization signal received through the auxiliary channel. The host is configured to transfer the synchronization signal including a first synchronization signal and a second synchronization signal that is different from the first synchronization signal, to the display driving circuit, through the auxiliary channel.

20 Claims, 12 Drawing Sheets

(56) References Cited

U.S. PATENT DOCUMENTS

| | | | | |
|---|---|---|---|---|
| 9,865,194 | B2 | 1/2018 | Koo et al. | |
| 11,620,011 | B2 * | 4/2023 | Park | G09G 3/20 345/174 |
| 2009/0177930 | A1 | 7/2009 | Park | |
| 2011/0157198 | A1 | 6/2011 | Vasquez et al. | |
| 2014/0168187 | A1 * | 6/2014 | Qu | G09G 3/3688 345/212 |
| 2016/0372077 | A1 * | 12/2016 | Koo | G09G 3/2096 |
| 2019/0014292 | A1 * | 1/2019 | Ishii | H10K 59/131 |
| 2020/0092516 | A1 * | 3/2020 | Moon | G06F 1/3215 |
| 2023/0306913 | A1 * | 9/2023 | Hatayama | G09G 3/20 |

* cited by examiner

DISPLAY DRIVING CIRCUIT, HOST, AND DISPLAY SYSTEM INCLUDING DISPLAY DRIVING CIRCUIT AND HOST

CROSS-REFERENCE TO RELATED APPLICATIONS

This application is based on and claims priority under 35 U.S.C. § 119 to Korean Patent Application No. 10-2022-0093432, filed on Jul. 27, 2022, and Korean Patent Application No. 10-2022-0184942, filed on Dec. 26, 2022, in the Korean Intellectual Property Office, the disclosures of each of which are incorporated by reference herein in their entirety.

BACKGROUND

Various example embodiments relate to a display driving circuit, a host, and/or a display system including the display diving circuit and the host, and more particularly, to a display driving circuit driving a display panel such that an image is displayed on the display panel, and a display system including the display diving circuit and the host.

A display device includes a display panel displaying an image and a display driving circuit driving the display panel. The display driving circuit may receive image data from a host, and drive the display panel by applying an image signal corresponding to the received image data, to a data line of the display panel. The display device may be implemented in various forms, such as one or more of a liquid crystal display (LCD), a light-emitting diode (LED) display, an organic LED (OLED) display, an active matrix OLED (AMOLED) display.

The display panel may be produced or fabricated through a low-temperature polycrystalline oxide (LTPO) process. A pixel circuit of an LTPO display panel is capable of maintaining image data for a long time without loss or with reduced loss of image data caused by charge leakage. Accordingly, the display panel may be driven at a low frame rate. Since the display panel can be driven at a low frame rate, power consumption for an interface between the host and the display driving circuit may be reduced, and the display device may operate in a video mode. In the video mode, image data received from the host may be displayed on the display panel without being stored in memory.

As the display panel is driven at a low frame rate, the host may operate in a low power mode, and when the host operates in the low power mode, timing desynchronization may occur between the host and the display driving circuit. Alternatively or additionally, in a normal mode that consumes more power than the low power mode, timing desynchronization between the host and the display driving circuit may occur due to electrical interference, such as electromagnetic interference (EMI). When timing desynchronization between display driving circuits occurs in the host, image quality problems, such as flicker, may occur. To solve or help reduce this problem, a technique for synchronizing a timing between the host and the display driving circuit may be required or desired. Alternatively or additionally, a technology for stably driving the display panel by the display driving circuit may be required or desired.

SUMMARY

Various example embodiments provide a display system including a host which transfers a synchronization signal modulated through an auxiliary channel and/or a display driving circuit controlling a display panel based on the synchronization signal.

According to some example embodiments, there is provided a display system including a host configured to transfer image data respectively corresponding to a plurality of frames through a main channel, and to transfer a synchronization signal through an auxiliary channel that synchronizes a clock signal of the host with a clock signal of the display driving circuit, a display panel configured to display the image data, and a display driving circuit configured to generate control signals driving the display panel, based on the synchronization signal received through the auxiliary channel. The host is configured to transfer the synchronization signal which includes a first synchronization signal and a second synchronization signal that is different from the first synchronization signal, to the display driving circuit, through the auxiliary channel.

Alternatively or additionally according to some example embodiments, there is provided a display driving circuit configured to operate in a normal mode of a video mode and a low power mode, the display driving circuit including an interface configured to receive, in the normal mode, image data from a host through a main channel, and to receive, in the normal mode and the low power mode, a first synchronization signal and a second synchronization signal that is different from the first synchronization signal through an auxiliary channel, a data processor configured to receive the image data from the interface and convert the image data, and a timing controller configured to generate control signals based on the first synchronization signal and the second synchronization signal, the control signals configured to drive a display panel.

Alternatively or additionally, according to some example embodiments, there is provided a host including an interface configured to transfer image data to a display driving circuit through a main channel and to transfer a synchronization signal to display driving circuit through an auxiliary channel, a display processor configured to generate the image data, and a sync generator configured to generate the synchronization signal The sync generator is configured to generate an emission synchronization signal and a horizontal synchronization signal, the emission synchronization signal configured to provide information about a time for controlling an emission time of pixels included in a display panel driven by the display driving circuit.

BRIEF DESCRIPTION OF THE DRAWINGS

Various example embodiments will be more clearly understood from the following detailed description taken in conjunction with the accompanying drawings in which.

DETAILED DESCRIPTION OF VARIOUS EXAMPLE EMBODIMENTS

Hereinafter, embodiments of the inventive concept will be described more fully with reference to the accompanying drawings.

Figure 1:
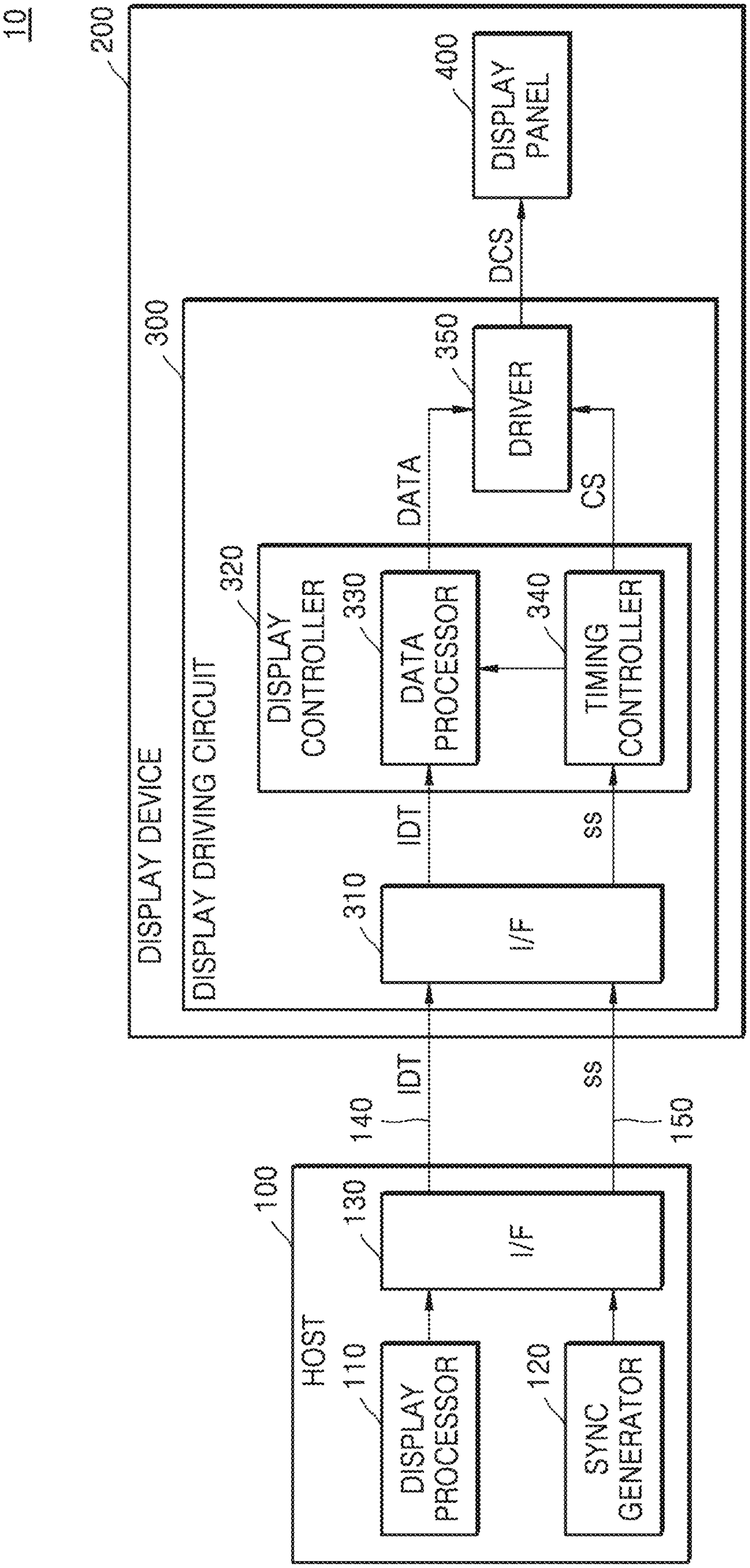
FIG. 1 is a block diagram illustrating a display system according to some example embodiments.

FIG. 1 is a block diagram illustrating a display system according to some example embodiments.

A display system 10 according to some example embodiments may be mounted in an electronic device having an image display function. Examples of the electronic device may include one or more of smartphones, tablet personal computers (PCs), portable multimedia player (PMPs), cameras, wearable devices, internet of things, and televisions, digital video disk (DVD) players, refrigerators, air conditioners, air purifiers, set-top boxes, robots, drones, various medical devices, navigation devices, global positioning system (GPS) receivers, Advanced Drivers Assistance Systems (ADAS), vehicle devices, furniture, or various measuring devices.

Referring to FIG. 1, the display system 10 may include a host 100, a display driving circuit 300 (or referred to as a display driving integrated circuit), and a display panel 400. In some example embodiments, the display driving circuit 300 and the display panel 400 may be implemented as a single module, and the module may be referred to as a display device 200. For example, the display driving circuit 300 may be mounted on a circuit film such as one or more of a Tape Carrier Package (TCP), a Chip On Film (COF), a Flexible Print Circuit (FPC), etc., and may be attached to the display panel 400 using a tape automatic bonding (TAB) method or may be mounted in a non-display area of the display panel 400 by using a Chip on Glass (COG) or Chip on Plastic (COP) method.

The host 100 may control or at least partially control the display system 10 overall. The host 100 may generate image data IDT to be displayed on the display panel 400 and transmit the image data IDT to the display driving circuit 300.

The host 100 may include an application processor. However, the host 100 is not limited thereto, and may be implemented using various types of processors, such as one or more of a central processing unit (CPU), a microprocessor, a multimedia processor, and a graphics processor. In some example embodiments, the host 100 may be implemented as an integrated circuit (IC), or may be implemented as a mobile application processor (AP) or system on chip (SoC).

The host 100 may include a display processor 110, a sync generator circuit or a sync generator 120, and an interface 130. The display processor 110 may control the operation of the display device 200. The display processor 110 may transmit the image data IDT to be displayed on the display device 200, to the display device 200 through the interface 130.

The display processor 110 may generate the image data IDT to be displayed on the display panel 400 and transmit the image data IDT to the display driving circuit 300. The display panel 400 may display an image in units of frames, and the image data IDT may correspond to a plurality of frames. In some example embodiments, the display processor 110 may transfer the image data IDT through a main channel 140. The interface 130 may be connected to the display driving circuit 300 through the main channel 140. The interface 130 may transmit the image data IDT to the display driving circuit 300 through the main channel 140.

The host 100 may transmit the image data IDT to the display driving circuit 300. The host 100 may provide the image data IDT to the display device 200 through the main channel 140 according to a high-speed serial interface (HSSI). As an example, the host 100 may provide the image data IDT to the display device 200 according to the Mobile Industry Processor Interface (MIPI) standard, but this is only an example and example embodiments are not limited thereto. The host 100 may transmit a synchronization packet for timing control to the display driving circuit 300. In some example embodiments, the host 100 may transfer a synchronization packet to the display driving circuit 300 through the main channel 140.

The sync generator 120 may generate a synchronization signal ss for synchronizing the host 100 with the display driving circuit 300. In detail, the synchronization signal ss may synchronize an internal clock signal of the display driving circuit 300 with a clock signal generated by the host 100. The sync generator 120 may generate the synchronization signal ss based on driving information of the display panel 400. The driving information of the display panel 400 may include one or more of a pixel resolution of the display panel 400, a vertical back porch, a vertical front porch, a horizontal back porch, a horizontal front porch, a frame rate of the display panel 400, and the like.

The sync generator 120 may generate a first synchronization signal and a second synchronization signal. The first synchronization signal and the second synchronization signal may be included in the synchronization signal ss. The first synchronization signal may correspond to or refer to a signal for notifying a start of a frame, and the second synchronization signal may correspond to or refer to a signal for notifying a start of each horizontal line in one frame. For example, the first synchronization signal may be a vertical synchronization signal, and the second synchronization signal may be a horizontal synchronization signal; alternatively, the first synchronization signal may be a horizontal synchronization signal, and the second synchronization signal may be a vertical synchronization signal.

The sync generator 120 may generate the first synchronization signal and the second synchronization signal differently from each other. In some example embodiments, at least one of a pulse width, the number of pulses, and a pulse pattern of the first synchronization signal may be different from a corresponding respective of the second synchronization signal. For example, the sync generator 120 may generate a first synchronization signal and a second synchronization signal by setting a duty ratio of the first synchronization signal to be different from that of the second synchronization signal so that a pulse width of the first synchronization signal is less than a pulse width of the second synchronization signal. Alternatively or additionally, the sync generator 120 may generate two pulses of the first synchronization signal during one horizontal period, and may generate one pulse of the second synchronization signal during one vertical period. However, example embodiments not limited to the listed examples, and the first synchronization signal and the second synchronization signal may be generated differently from each other in various manners.

The sync generator 120 may generate a third synchronization signal. The third synchronization signal may be included in the synchronization signal ss. The third synchronizing signal may provide information about a point in time for controlling an emission time of pixels included in the display panel 400. The third synchronization signal may include an emission synchronization signal. One frame may include a plurality of sub-frames, and the third synchronization signal may provide information about a start of each sub-frame and a point in time for controlling an emission time of pixels. In some example embodiments, when a frame is not divided into a plurality of sub-frames, the display driving circuit 300 may control the emission time of pixels based on the first synchronization signal. When a frame is divided into a plurality of sub-frames, the display driving circuit 300 may control the emission time of pixels based on the third synchronization signal.

The sync generator 120 may generate the first synchronization signal, the second synchronization signal, and the third synchronization signal differently from each other. In some example embodiments, at least one of a pulse width, the number of pulses, and a pulse pattern of each of the first synchronization signal, the second synchronization signal, and the third synchronization signal may be different from respective others thereof. For example, by setting a duty ratio of the first synchronization signal, a duty ratio of the second synchronization signal, and a duty ratio of the third synchronization signal to be (or to all be) different from each other, the sync generator 120 may generate the first synchronization signal, the second synchronization signal, and the third synchronization signal such that a pulse width of the first synchronization signal is less than that of the third synchronization signal, and the pulse width of the third synchronization signal is less than a pulse width of the second synchronization signal. However, example embodiments are not limited thereto, and the first synchronization signal, the second synchronization signal, and the third synchronization signal may be generated differently from each other in various manners.

In some example embodiments, the first synchronization signal may be included in the third synchronization signal. The first synchronization signal may be identical to the third synchronization signal. When the first synchronization signal is identical to the third synchronization signal, the third synchronization signal, which is the first synchronization signal, may provide information about a start of a frame and a point in time for controlling an emission time of pixels. The sync generator 120 may generate the second synchronization signal and the third synchronization signal differently from each other. In some example embodiments, at least one of a pulse width, the number of pulses, and a pulse pattern of each of the second synchronization signal and the third synchronization signal may be different from respective others thereof.

The sync generator 120 may generate the synchronization signal ss and transmit the synchronization signal ss to the display driving circuit 300. In some example embodiments, the host 100 may transfer the synchronization signal ss to the display driving circuit 300 through the interface 130. The interface 130 may transmit the synchronization signal ss to the display driving circuit 300 through an auxiliary channel 150. The interface 130 may be connected to the display driving circuit 300 through the auxiliary channel 150. As an example, the host 100 may provide the synchronization signal ss to the display device 200 according to the Display Port (DP) standard, but this is only an example and is not limited thereto.

The display system 10 may be driven in a low power mode. The host 100 may also enter a low power mode. When the host 100 enters a low power mode, at least some of components of the host 100 for driving the display device 200 may be driven with low power, and/or the power may be turned off. For example, the main channel 140 may be driven with low power or the power may be turned off, and the image data IDT may not be transferred to the display driving circuit 300. Even when the host 100 is in a low power mode, the auxiliary channel 150 may be driven with low power or the power may not be turned off, and the synchronization signal ss may be continuously transferred to the display driving circuit 300. Thus, even when the display system 10 is in a low power mode, the host 100 and the display driving circuit 300 may be synchronized with each other based on the synchronization signal ss.

Alternatively or additionally, the host 100 may differently generate at least one of the first synchronization signal, the second synchronization signal, and the third synchronization signal, and transfer the generated signal to the display driving circuit 300, and accordingly, the display driving circuit 300 may more easily and/or more accurately control a timing for driving the display panel 400 based on the synchronization signal ss.

The display driving circuit 300 may convert the image data IDT received from the host 100, into image signals for driving the display panel 400, and supply the image signals to the display panel 400, thereby displaying an image on the display panel 400.

The display driving circuit 300 may operate in a video mode for receiving the image data IDT from the host 100. The display device 200 may display moving images and still images in a video mode. The display driving circuit 300 may control the image data IDT received from the host 100 in a video mode to be displayed on the display panel 400, without storing the same in an internal memory of the display driving circuit 300.

The display driving circuit 300 may include an interface 310, a display controller 320, and a driver 350. The display driving circuit 300 may further include components other than those illustrated in FIG. 1, as needed. For example, the display driving circuit 300 may further include a memory, such as but not limited to a cache memory and/or a buffer memory that includes DRAM cells and/or SRAM cells.

The display driving circuit 300 may receive the image data IDT through the main channel 140. The interface 310 may be connected to the host 100 through the main channel 140. The interface 310 may receive the image data IDT through the main channel 140. In some example embodiments, the interface 130 of the host 100 and the interface 310 of the display driving circuit 300 may each include a Mobile Industry Processor Interface (MIPI). The interface 130 of the host 100 and the interface 310 of the display driving circuit 300 may each include a MIPI and a General-Purpose Input/Output (GPIO). For example, the synchronization signal ss may be transmitted from the host 100 to the display driving circuit 300 through a GPIO. However, example embodiments are not limited thereto. The interface 130 of the host 100 and the interface 310 of the display driving circuit 300 may respectively be Display Port (DP). In a video mode, the image data IDT received through the main channel 140 may be transmitted to the display controller 320.

The display controller 320 may control up to the overall operation of the display driving circuit 300. The display controller 320 may include a data processor 330 and a timing controller 340. The data processor 330 may convert the image data IDT and transmit data DATA obtained by the converting, to the driver 350.

The data processor 330 may not receive the image data IDT from the interface 310 when the display driving circuit 300 is in a low power mode. The display system 10 may be driven in a low power mode. The display driving circuit 300 may also enter a low power mode. When the display driving circuit 300 enters a low power mode, all or at least some of components of the display driving circuit 300 for driving the display device 200 may be driven with low power or the power may be turned off. For example, the main channel 140 may be driven with low power or the power may be turned off, and the display driving circuit 300 may not receive the image data IDT.

The display driving circuit 300 may receive the synchronization signal ss through the auxiliary channel 150. The interface 310 may be connected to the host 100 through the auxiliary channel 150. The interface 310 may receive the synchronization signal ss through the auxiliary channel 150. The synchronization signal ss received through the auxiliary channel 150 may be transmitted to the display controller 320. The synchronization signal ss may be transmitted to the timing controller 340.

The timing controller 340 may generate control signals CS for driving the display panel 400 based on the synchronization signal ss received through the auxiliary channel 150. The timing controller 340 may transfer the control signals CS to the driver 350.

The timing controller 340 may receive the synchronization signal ss from the interface 310, when the display driving circuit 300 is in a low power mode. Additionally or alternatively, the timing controller 340 may receive the synchronization signal ss when the display driving circuit 300 is in a normal mode rather than a low power mode.

The timing controller 340 may generate control signals CS for controlling the driver 350 to drive the display panel 400 based on the synchronization signal ss. The driver 350 may provide voltages (e.g. the same or different voltages, such as positive and/or negative voltages) to gate lines and data lines of the display panel 400 in response to the control signals CS. Operations of the timing controller 340 and the driver 350 are described below in detail with reference to FIGS. 2 and 3.

The timing controller 340 may receive the synchronization signal ss including a first synchronization signal and a second synchronization signal. The timing controller 340 may distinguish the first synchronization signal from the second synchronization signal. For example, the timing controller 340 may detect a signal having a relatively small pulse width as the first synchronization signal and detect a signal having a larger pulse width than the first synchronization signal, as a second synchronization signal.

The timing controller 340 may receive the synchronization signal ss including a first synchronization signal, a second synchronization signal, and a third synchronization signal. The timing controller 340 may distinguish the first synchronization signal, the second synchronization signal, and the third synchronization signal from each other. For example, the timing controller 340 may detect a signal having a smallest pulse width as the first synchronization signal, detect a signal having a largest pulse width as the second synchronization signal, a signal having a pulse width greater than the first synchronization signal and smaller than the second synchronization signal as the third synchronization signal. The above description corresponds to an example of distinguishing between synchronization signals, but example embodiments are not limited thereto, and the timing controller 340 may distinguish between synchronization signals in various manners.

The timing controller 340 may distinguish the first synchronization signal from the third synchronization signal even when the first synchronization signal is identical to the third synchronization signal. In some example embodiments, the timing controller 340 may determine whether the synchronization signal ss is the first synchronization signal and also corresponds to the third synchronization signal, or only the third synchronization signal, based on the image data IDT and the synchronization packet transmitted through a main channel. The timing controller 340 may generate a control signal CS based on at least one of the first synchronization signal, the second synchronization signal, and the third synchronization signal.

The timing controller 340 may control an emission time of pixels included in the display panel 400, based on the synchronization signal ss. In some example embodiments, the timing controller 340 may generate the control signal CS such that the driver 350 generates an emission control signal for controlling the emission time of pixels of the display panel 400. The timing controller 340 may transfer the control signal CS such that the driver 350 generates an emission control signal. The timing controller 340 may control the emission time of pixels based on the first synchronization signal. The timing controller 340 may control the emission time of pixels based on the third synchronization signal. The timing controller 340 may control the emission time of pixels based on at least one of the first synchronization signal and the third synchronization signal.

The display driving circuit 300 may control components of the display driving circuit 300 based on the synchronization signal ss. In some example embodiments, the host 100 may change a mode of the display system 10, and the host 100 may transmit a command for switching a mode of the display driving circuit 300, to the display driving circuit 300. When receiving a command, the display driving circuit 300 may start to switch the mode of the display driving circuit 300, and control the components of the display driving circuit 300 based on the synchronization signal ss, such that a state of the display driving circuit 300 is switched from a normal mode to a low power mode or switched from a low power mode to a normal mode. Alternatively or additionally, the display driving circuit 300 may be turned on or off based on the synchronization signal ss.

In some example embodiments, the synchronization signal ss may include a command for the display driving circuit 300 to control the components of the display driving circuit 300. The command may be distinguished from the first synchronization signal, the second synchronization signal, and the third synchronization signal. For example, at least one of a pulse width, a number of pulses, and a pulse pattern of each of the command, the first synchronization signal, the second synchronization signal, and the third synchronization signal may be different from the others thereof. For example, the synchronization signal ss may further include a wake-up command for waking up the display driving circuit 300 in a low power mode. When receiving the synchronization signal ss, the display driving circuit 300 may control the components of the display driving circuit 300 such that the main channel 140 operates normally.

In some example embodiments, the timing controller 340 may determine whether at least one error has occurred in a process of receiving the synchronization signal ss, based on the synchronization signal ss. The timing controller 340 may distinguish the first synchronization signal from the second synchronization signal, and determine whether at least one error has occurred in the process of receiving the synchronization signal ss, based on the number of received second synchronization signals. When at least one error has occurred in the process of receiving the synchronization signal ss, the emission time of pixels may be different compared to when no error occurs. The timing controller 340 may determine, based on a difference in an emission time when at least one error has occurred in the process of receiving the synchronization signal ss and an emission time when no error has occurred in the process of receiving the synchronization signal ss, whether or not at least one error has occurred in the processing of receiving the synchronization signal ss. When one or more errors have occurred in the process of receiving the synchronization signal ss, the timing controller 340 may recover the one or more errors. Alternatively or additionally, when the difference in the emission time of pixels is relatively large, the timing controller 340 may notify the host 100 of the occurrence of the error, so that feedback to overcome the error occurrence, generated by the host 100, may be transferred to the display driving circuit 300. When the difference in the emission time between the pixels is relatively small, the timing controller 340 may restore the error by controlling the emission time of pixels of the display panel 400. However, a method of recovering at least one error is not limited to the listed example. Even when at least one error occurs in the process of receiving the synchronization signal ss from the host 100, image quality problems, such as flicker, may be solved.

By receiving and distinguishing a synchronization signal ss in which at least one of the first synchronization signal, the second synchronization signal, and the third synchronization signal is different from others, the display driving circuit 300 may more easily and/or more accurately control a timing of driving the display panel 400, based on the synchronization signal ss. Alternatively or additionally, by receiving the synchronization signal ss through the auxiliary channel 150, the display driving circuit 300 may be synchronized with the host 100 even when the display system 10 is in a low power mode. The display driving circuit 300 may stably generate control signals CS for driving the display panel 400 based on the synchronization signal ss received through the auxiliary channel 150.

The display panel 400 may include a display unit on which an image is actually displayed, and may include one of display devices that receive electrically transmitted image signals and display a two-dimensional image, such as one or more of a thin film transistor-liquid crystal display (TFT-LCD), an organic light-emitting diode (OLED) display, a field emission display, a plasma display panel (PDP). The display panel 400 may be implemented as a flat panel display and/or a flexible display panel of another type.

In some example embodiments, the display panel 400 may include a low-temperature polycrystalline oxide (LTPO) display panel produced through an LTPO process. The display panel 400 may be driven at a relatively low frame rate. When the display panel 400 is driven at a relatively low frame rate in a video mode, the display system 10 may enter a low power mode. When the display system 10 enters a low power mode, the host 100 and the display driving circuit 300 may also enter a low power mode.

While the host 100 is in a low power mode, at least some of components of the host 100 for driving the display panel 400 may be driven with low power or the power may be turned off. While the display driving circuit 300 is in a low power mode, at least some of components of the display driving circuit 300 for driving the display panel 400 may be driven with low power or the power may be turned off. The low power mode may be maintained for a plurality of vertical periods. A vertical period may correspond to one frame section. Since the low power mode is driven at low power for a plurality of vertical periods, the low power mode may be driven at low power for a longer period of time than when driven at low power for a plurality of horizontal periods, and power consumption may be reduced. Even when the display system 10 enters a low power mode, an internal clock signal of the display driving circuit 300 and a clock signal generated by the host 100 may be synchronized with each other based on the synchronization signal ss transmitted through the auxiliary channel 150.

In some example embodiments, each of the components in FIG. 1 may communicate with other components in FIG. 1, to exchange data, such as commands and/or information, in a serial manner and/or in a parallel manner, via a wired connection and/or via a wireless connection. The data may be analog and/or may be digital, and the communication may be one or more of one-way or multi-way (such as broadcast and/or two-way communication).

Figure 2:
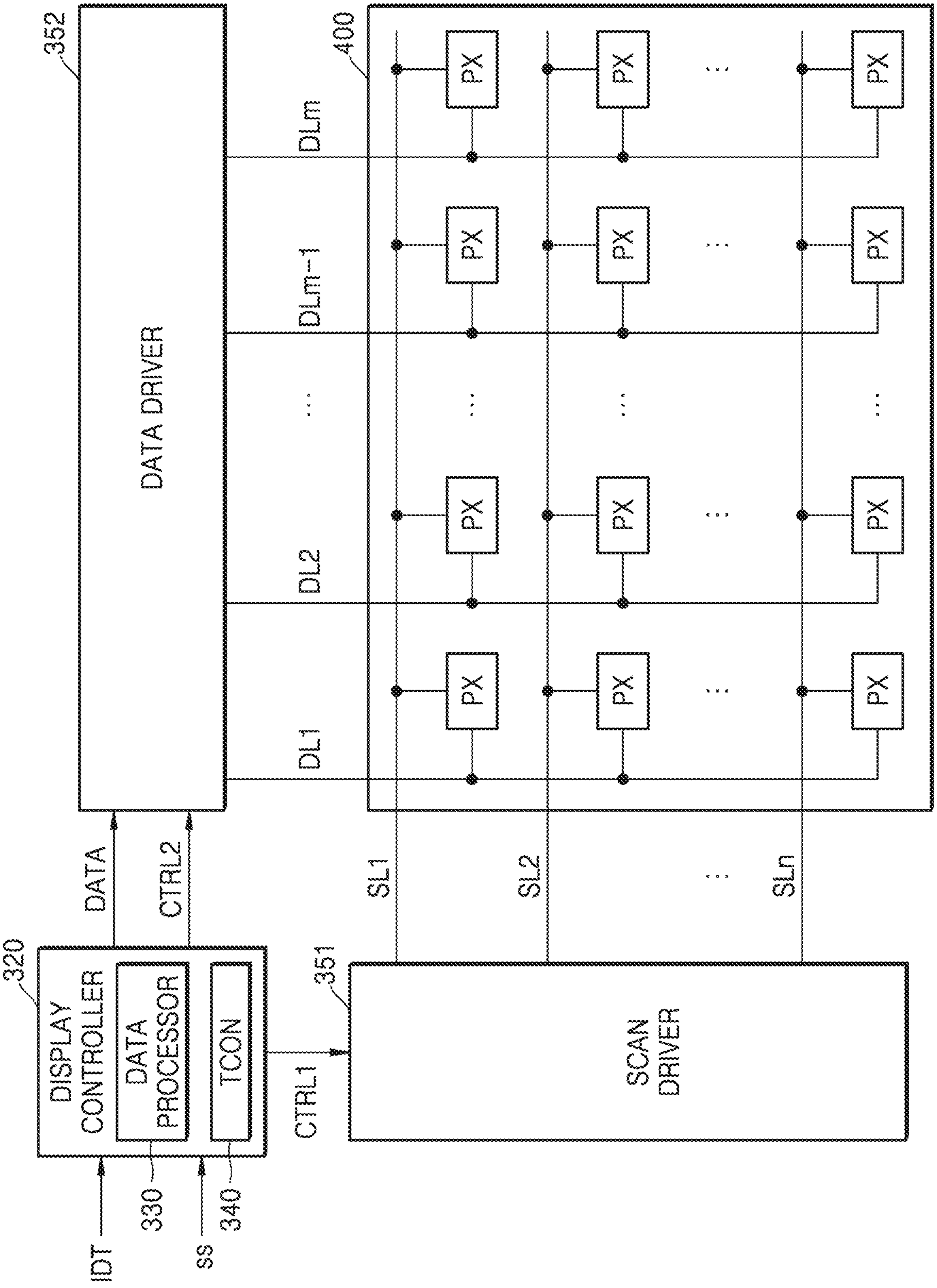
FIG. 2 is a block diagram illustrating some components of a display device according to some example embodiments.

FIG. 2 is a block diagram illustrating some components of a display device, according to some example embodiments. The display controller 320, the timing controller 340, the data processor 330, a scan driver 351 and a data driver 352, and the display panel 400 of FIG. 2 respectively correspond to the display controller 320, the timing controller 340, the data processor 330, the driver 350, and the display panel 400 of FIG. 1, and thus, repeated descriptions thereof are omitted.

However, the display driving circuit 300 may not include the scan driver 351, and the scan driver 351 may be included as a separate component from the display driving circuit 300, in the display device 200.

The display panel 400 may include a plurality of pixels PX arranged in a matrix form, and may display an image in units of frames. The display panel 400 may include scan lines SL1 to SLn arranged in a row direction, data lines DL1 to DLm arranged in a column direction, and the pixels PX formed at intersections between the scan lines SL1 to SLn and the data lines DL1 to DLm.

The scan driver 351 may sequentially select the pixels PX by sequentially applying scan signals to the pixels PX in units of lines. The scan driver 351 may sequentially supply a scan on signal to the scan lines SL1 to SLn in response to a scan control signal CTRL1 provided from the timing controller 340, thereby sequentially selecting the scan lines SL1 to SLn. According to a scan on signal output from the scan driver 351, the scan lines SL1 to SLn may be sequentially selected, and as a grayscale voltage corresponding to the pixels PX is applied to the pixels PX connected to a selected scan line, through the data lines DL1 to DLm, a display operation may be performed. A scan off signal (e.g., a scan voltage at a logic high level) may be supplied to the scan lines SL1 to SLn during a period in which the scan on signal is not supplied to the scan lines SL1 to SLn.

The data driver 352 may convert, in response to a data control signal CTRL2, data DATA corresponding to the image data IDT, into image signals, which are analog signals, and may provide the image signals to the data lines DL1 to DLn. The data driver 352 may include a plurality of channel amplifiers (not shown), and each of the plurality of channel amplifiers may provide image signals to at least one corresponding data line.

The timing controller 340 may control up to the overall operation of the display panel 400. The timing controller 340 may be implemented with hardware, software, or a combination of hardware and software. For example, the timing controller 340 may be implemented using digital logic circuits and/or registers that perform various functions below.

The timing controller 340 may receive the synchronization signal ss, and generate a control signal (e.g., the scan control signal CTRL1 and the data control signal CTRL2) for controlling the data driver 352 and the scan driver 351 such that the image data IDT is displayed on the display panel 400.

The data processor 330 may convert a format of the image data IDT received from the outside of the display driving circuit 300 such that the image data IDT meets the interface specifications with respect to the data driver 352, and transmit the data DATA obtained by the converting, to the data driver 352.

Figure 3:
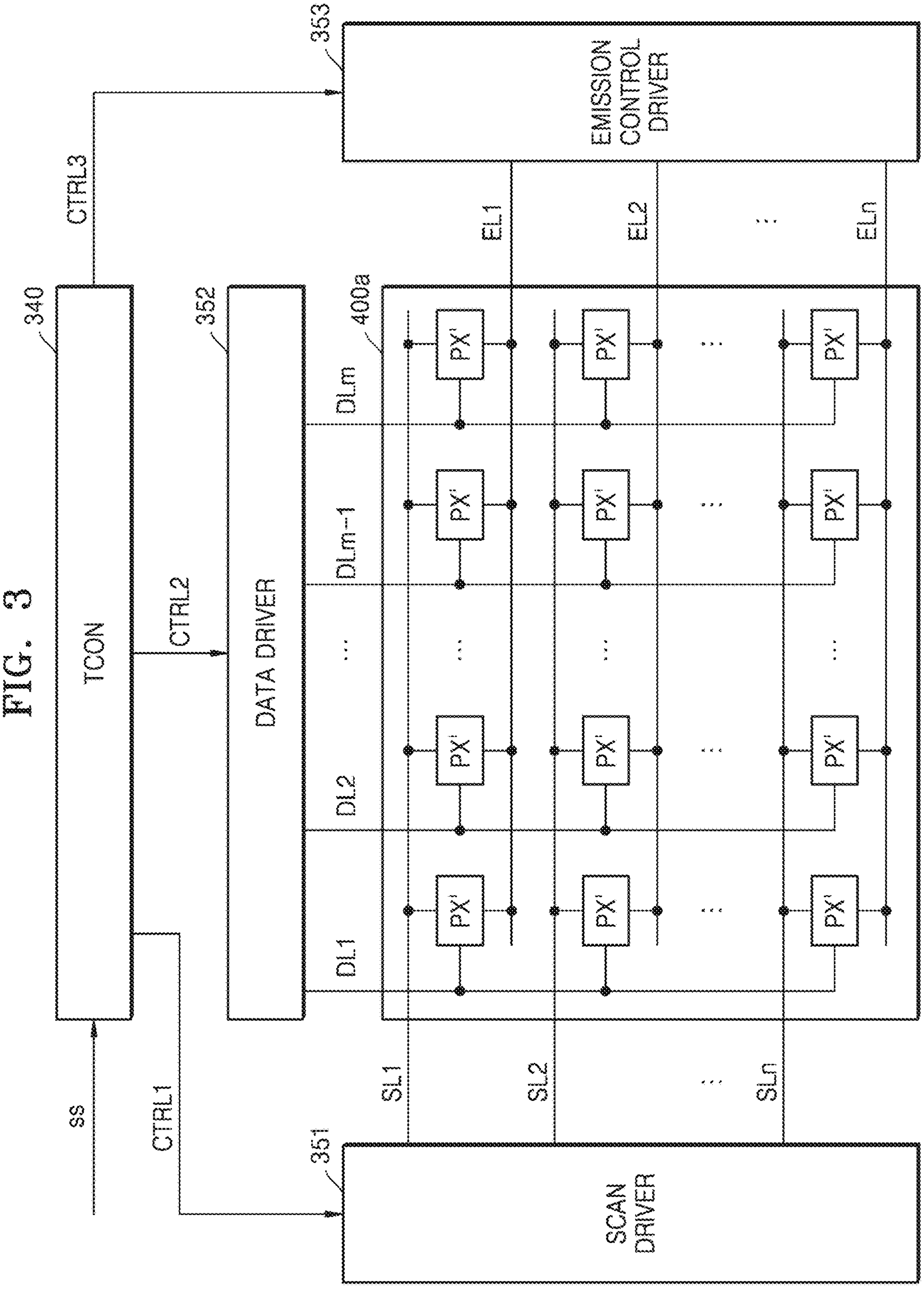
FIG. 3 is a block diagram for describing a display panel according to some example embodiments.

FIG. 3 is a block diagram for describing a display panel according to some example embodiments. The timing controller 340, the driver 350, and the display panel 400 of FIG. 1 may correspond to the timing controller 340, the scan driver 351, the data driver 352, and an emission control driver 353, and a display panel 400*a* of FIG. 3, respectively. In FIG. 3, an OLED panel is described as an example of the display panel 400 of FIG. 1, and repeated descriptions of the same reference numerals as in FIG. 2 are omitted.

Referring to FIG. 3, the display panel 400*a* may include a plurality of data lines DL1 to DLm, a plurality of scan lines SL1 to SLn, and a plurality of emission control lines ELI to ELn, and a plurality of pixels PX' disposed between the lines. Each of the plurality of pixels PX' may be connected to a corresponding scan line, data line, and emission control line. In some example embodiments, the number of data lines m may be the same as, or different from (e.g. greater than or less than) the number of scan lines n.

The emission control driver 353 may be connected to the plurality of emission control lines ELI to ELn and sequentially apply emission control signals to the pixels PX' to control an emission time of pixels PX'. Each of the pixels PX' may include a corresponding OLED, and may include a transistor (such as am NMOS or PMOS access transistor) supplying a driving current corresponding to an image signal to the OLED and/or blocking the driving current. An emission control signal provided through each of the plurality of emission control lines ELI to ELn may control an emission time of the OLED by turning on/off a transistor that provides a driving current to the OLED.

A luminance value of each of the pixels PX' may vary according to a duty ratio of the emission control signal. As the duty ratio of the emission control signal (for example, a length of an on-period of the emission control signal relative to a period of the emission control signal) increases, an emission time of pixels PX' may increase and the pixels PX' may exhibit high luminance. As described above, the emission control driver 353 may adjust pulse width modulation (PWM) of the emission control signal under control by a timing controller (e.g., the timing controller 340 of FIG. 2), thereby controlling the luminance of the display panel 400*a*.

The timing controller may control the emission control driver 353 to generate an emission control signal based on the synchronization signal ss. The timing controller may generate a control signal CTRL3 for controlling the emission control driver 353 based on the synchronization signal ss. For example, the timing controller may control the emission control driver 353 based on the first synchronization signal. As another example, the timing controller may control the emission control driver 353 based on the third synchronization signal.

Figure 4:
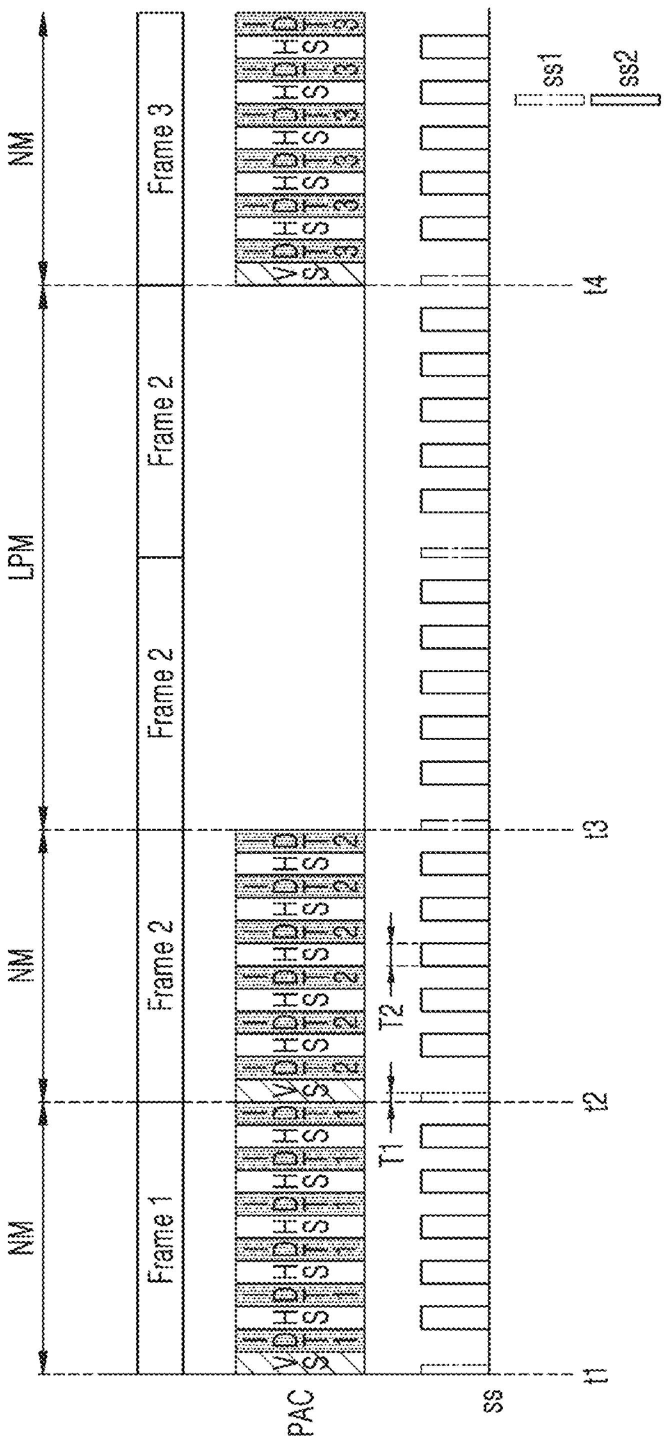
FIG. 4 is a diagram for describing a pulse width of a synchronization signal, according to some example embodiments.
Figure 5:
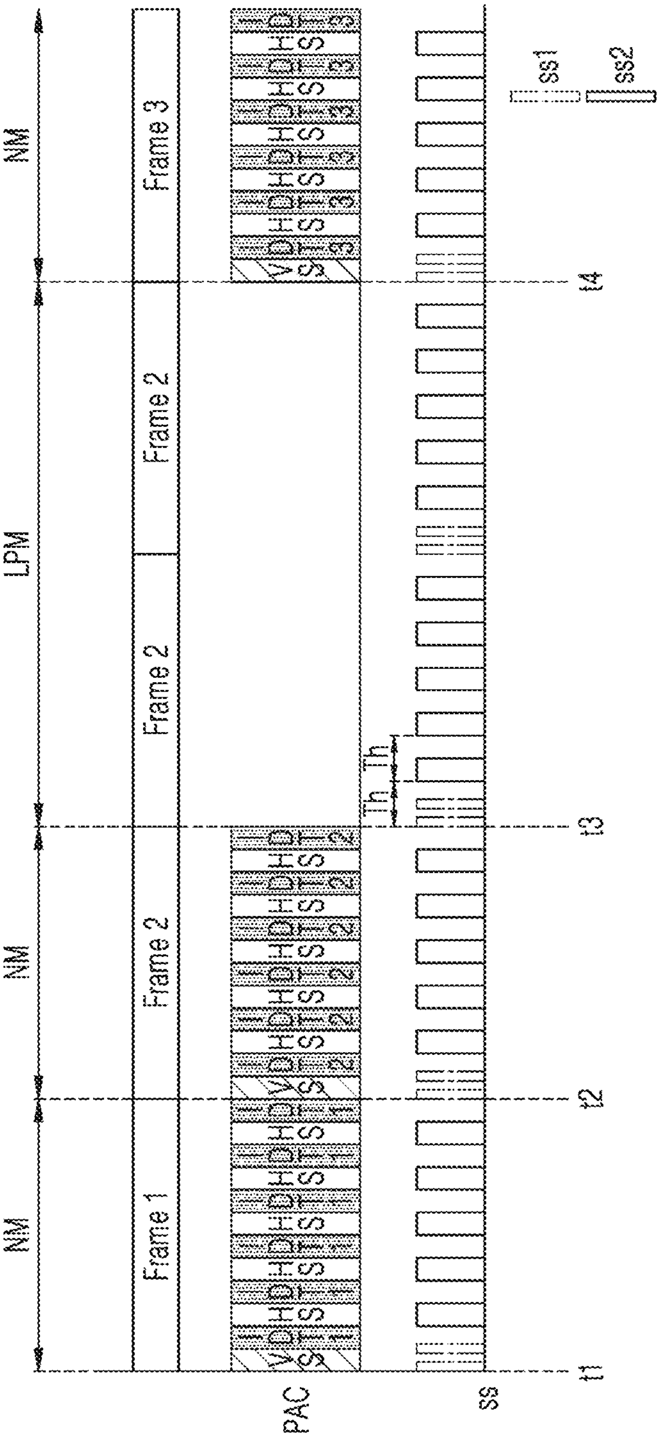
FIG. 5 is a diagram for describing the number of pulses of a synchronization signal, according to some example embodiments.
Figure 6:
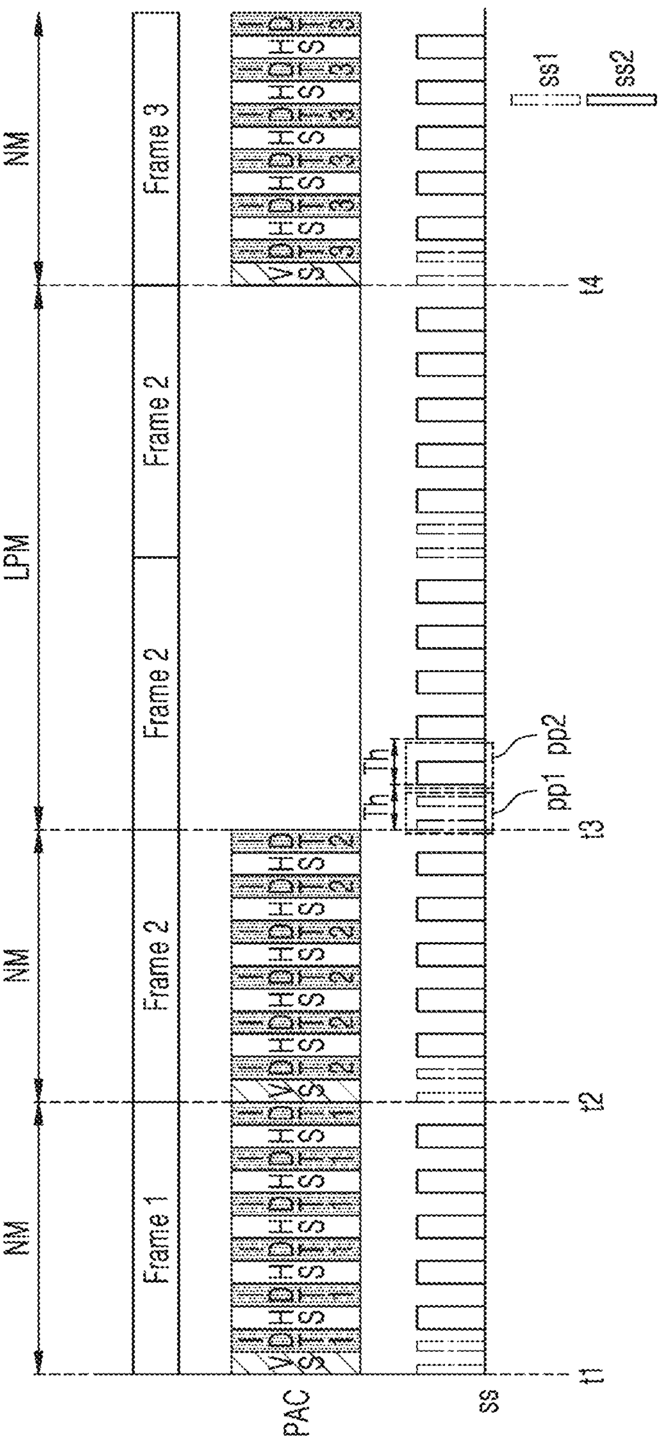
FIG. 6 is a diagram for describing a pulse pattern of a synchronization signal, according to some example embodiments.

FIGS. 4 to 6 are diagrams for describing a synchronization signal according to some example embodiments. FIG. 4 is a diagram for describing a pulse width of a synchronization signal, according to some example embodiments. In the description of FIGS. 4 to 6, descriptions that overlap with the description provided above are omitted.

Referring to FIG. 4, a host (e.g., the host 100 of FIG. 1) may generate first to third image data IDT1, IDT2, and IDT3. The host may generate the first image data IDT1 corresponding to a first frame. The host may generate the second image data IDT2 corresponding to a second frame. The host may generate the third image data IDT3 corresponding to a third frame. The host may generate a synchronization packet. The host may generate a vertical sync packet VS and a horizontal sync packet HS. The host may transfer a packet PAC to a display driving circuit (e.g., the display driving circuit 300 of FIG. 1). The packet PAC may include the image data IDT, the vertical sync packet VS, and the horizontal sync packet HS. Here, the packet PAC may include a set of bits.

The host may transfer the packet PAC to the display driving circuit through a main channel (e.g., the main channel 140 of FIG. 1). The host may transfer the first to third image data IDT1, IDT2, and IDT3 to the display driving circuit through the main channel. In a normal mode NM, the host may transfer the packet PAC to the display driving circuit. When the host enters the normal mode NM, at least some of components of the host for driving the display device may be driven with low power or the power may not be turned off. For example, the host may transmit the packet PAC through the main channel. The host may transmit the first image data IDT, the second image data IDT2, and the third image data IDT3 to the display driving circuit through the main channel.

In a low power mode LPM, the host may not transfer the packet PAC to the display driving circuit. When the host enters the low power mode LPM, at least some of components of the host 100 for driving the display device may be driven with low power and/or the power may be turned off. When the host enters the low power mode LPM, the main channel may be driven with low power or the power may be turned off, and the image data IDT may not be transmitted to the display driving circuit.

The host may generate a synchronization signal ss. The synchronization signal ss may include a first synchronization signal ss1 and a second synchronization signal ss2. The host may generate the first synchronization signal ss1 and the second synchronization signal ss2 differently from each other. In some example embodiments, at least one of a pulse width, the number of pulses, and a pulse pattern of the first synchronization signal ss1 may be different from a corresponding one of the second synchronization signal ss2.

A pulse width T1 of the first synchronization signal ss1 may be different from a pulse width T2 of the second synchronization signal ss2. The host may generate the first synchronization signal ss1 and the second synchronization signal ss2 by adjusting PWM of the synchronization signal ss. The host may set a duty ratio of the first synchronization signal ss1 to be different from that of the second synchronization signal ss2. For example, the host may generate the first synchronization signal ss1 and the second synchronization signal ss2 such that the pulse width T1 of the first synchronization signal ss1 is less than the pulse width T2 of the second synchronization signal ss2. However, example embodiments are not limited thereto, and the host may generate the first synchronization signal ss1 and the second synchronization signal ss2 such that the pulse width T1 of the first synchronization signal ss1 is greater than the pulse width T2 of the second synchronization signal ss2.

The host may transfer the synchronization signal to the display driving circuit through an auxiliary channel (e.g., the auxiliary channel 150 of FIG. 1). In the normal mode NM, the host may transfer the synchronization signal ss to the display driving circuit. In the low power mode LPM, the host may transfer the synchronization signal ss to the display driving circuit. Even when the host enters the low power mode LPM, the auxiliary channel may be driven with low power or the power may not be turned off, and the synchronization signal ss may be continuously transferred to the display driving circuit.

The display driving circuit may receive the image data IDT1, IDT2, and IDT3 from the host. The display driving circuit may receive the image data IDT1, IDT2, and IDT3 through the main channel. The display driving circuit may convert the first to third image data IDT1, IDT2, and IDT3 received from the host, into image signals for driving a display panel (e.g., the display panel 400 of FIG. 1).

The display driving circuit may receive the image data IDT1, IDT2, and IDT3 when the host is in a normal mode NM. For example, the display driving circuit may receive the first image data IDT1 from a first point in time t1. The display driving circuit may receive the second image data IDT2 from a second point in time t2.

The display driving circuit may not receive the image data IDT1, IDT2, and IDT3 when the host is in a low power mode LPM. For example, the display driving circuit may not receive the image data IDT1, IDT2, and IDT3 from a third point in time t3.

The display driving circuit may receive a synchronization signal ss from the host. The display driving circuit may receive the synchronization signal ss through the auxiliary channel. The display driving circuit may generate control signals for driving the display panel based on the synchronization signal ss received through the auxiliary channel.

The display driving circuit may distinguish the first synchronization signal ss1 from the second synchronization signal ss2. In some example embodiments, the display driving circuit may distinguish the first synchronization signal ss1 from the second synchronization signal ss2 based on a pulse width of the synchronization signal ss. For example, the display driving circuit may distinguish a signal having a relatively smaller pulse width among the synchronization signals ss received through the auxiliary channel as a first synchronization signal ss1, and a signal having a larger pulse width than the first synchronization signal ss1 as the second synchronization signal ss2.

The display driving circuit may receive a synchronization signal ss when the host is in a normal mode NM. For example, the display driving circuit may receive the first synchronization signal ss1 at the first point in time t1. The display driving circuit may have determined a start point of a first frame by receiving the first synchronization signal ss1 at the first point in time t1. The display driving circuit may have determined the start time of the frame based on receiving the synchronization signal ss through the auxiliary channel and receiving the image data IDT1, IDT2, and IDT3 through the main channel.

When the host is operating in a low power mode LPM, the display driving circuit may receive a synchronization signal ss. The display driving circuit may receive the synchronization signal ss through the auxiliary channel from the third point in time t3. For example, the display driving circuit may receive the first synchronization signal ss1 at the third point in time t3. The display driving circuit may receive the second synchronization signal ss2 after a certain time from the third point in time t3. Even when the host is in the low power mode, the display driving circuit may receive the synchronization signal ss through the auxiliary channel, and the host and the display driving circuit may be synchronized with each other based on the synchronization signal ss.

FIG. 5 is a diagram for describing the number of pulses of a synchronization signal, according to some example embodiments. Descriptions that overlap with the descriptions provided above are omitted.

Referring to FIG. 5, a host may transfer a packet PAC to a display driving circuit through a main channel. The host may transfer the image data IDT1, IDT2, and IDT3 to the display driving circuit through the main channel. In a normal mode NM, the host may transfer the packet PAC to the display driving circuit. In the low power mode LPM, the host may not transfer the packet PAC to the display driving circuit.

The host may generate a synchronization signal ss. The synchronization signal ss may include a first synchronization signal ss1 and a second synchronization signal ss2. The host may generate the first synchronization signal ss1 and the second synchronization signal ss2 differently from each other. In some example embodiments, at least one of a pulse width, the number of pulses, and a pulse pattern of the first synchronization signal ss1 may be different from that of the second synchronization signal ss2.

The number of pulses of the first synchronization signal ss1 may be different from the number of pulses of the second synchronization signal ss2. For a certain period of time, the number of pulses of the first synchronization signal ss1 may be different from the number of pulses of the second synchronization signal ss2. The number of pulses of the first synchronization signal ss1 during a horizontal cycle period Th may be different from the number of pulses of the second synchronization signal ss2 during the horizontal cycle period Th. The horizontal cycle period Th may refer to a horizontal time that is a time period between a start of one horizontal line and a start of a next horizontal line in a frame. However, example embodiments are not limited thereto, and the horizontal cycle period Th may include a plurality of horizontal times or a portion of one horizontal time. For example, the horizontal cycle period Th may be three horizontal times.

The host may generate different numbers of pulses of the first synchronization signal ss1 and the second synchronization signal ss2 during the horizontal cycle period Th. For example, the host may generate the first synchronization signal ss1 and the second synchronization signal ss1 such that the number of pulses of the first synchronization signal ss1 is two and the number of pulses of the second synchronization signal ss2 is one during the horizontal cycle period Th. However, the number of pulses is not limited thereto, and the host may generate various numbers of the first synchronization signal ss1 and the second synchronization signal ss1 such that the number of pulses of the first synchronization signal ss1 is different from that of the second synchronization signal ss2.

The host may transfer the synchronization signal ss to the display driving circuit through the auxiliary channel. In a normal mode NM, the host may transfer the synchronization signal ss to the display driving circuit. In the low power mode LPM, the host may transfer the synchronization signal ss to the display driving circuit.

The display driving circuit may receive the image data IDT1, IDT2, and IDT3 through the main channel. The display driving circuit may receive the image data IDT1, IDT2, and IDT3 when the host is in a normal mode NM. The display driving circuit may not receive the image data IDT1, IDT2, and IDT3 when the host is in a low power mode LPM.

The display driving circuit may receive the synchronization signal ss through the auxiliary channel. The display driving circuit may distinguish the first synchronization signal ss1 from the second synchronization signal ss2. In some example embodiments, during the horizontal cycle period Th, the display driving circuit may distinguish the first synchronization signal ss1 from the second synchronization signal ss2 based on the number of pulses of the synchronization signal ss. For example, among the synchronization signals ss received through the auxiliary channel, when the number of pulses during the horizontal cycle period Th is two, the display driving circuit may distinguish a corresponding synchronization signal ss as the first synchronization signal ss1, and when the number of pulses during the horizontal cycle period Th is one, the display driving circuit may distinguish a corresponding synchronization signal ss as the second synchronization signal ss2.

The display driving circuit may receive the synchronization signal ss when the host is in a normal mode NM. For example, the display driving circuit may receive the first synchronization signal ss1 having two pulses during the horizontal cycle period Th, from the first point in time t1. When the host is in a low power mode LPM, the display driving circuit may receive the synchronization signal ss. The display driving circuit may receive the synchronization signal ss through the auxiliary channel from the third point in time t3. For example, the display driving circuit may receive the first synchronization signal ss1 from the third point in time t3.

FIG. 6 is a diagram for describing a pulse pattern of a synchronization signal, according to some example embodiments. Descriptions that overlap with the descriptions provided above are omitted for brevity.

Referring to FIG. 6, a host may transfer a packet PAC to the display driving circuit through a main channel. The host may transmit image data IDT1, IDT2, and IDT3 to the display driving circuit through the main channel. In a normal mode NM, the host may transfer the packet PAC to the display driving circuit. In the low power mode LPM, the host may not transfer the packet PAC to the display driving circuit.

The host may generate a synchronization signal ss. The synchronization signal ss may include a first synchronization signal ss1 and a second synchronization signal ss2. The host may generate the first synchronization signal ss1 and the second synchronization signal ss2 differently from each other. In some example embodiments, at least one of a pulse width, the number of pulses, and a pulse pattern of the first synchronization signal ss1 may be different from that of the second synchronization signal ss2.

A pulse pattern of the first synchronization signal ss1 may be different from that of the second synchronization signal ss2. By writing code on the synchronization signal ss, the host may generate the first synchronization signal ss1 and the second synchronization signal ss2. For a certain period of time, a pulse pattern of the first synchronization signal ss1 may be different from that of the second synchronization signal ss2. A pulse pattern of the first synchronization signal ss1 during the horizontal cycle period Th may be different from the that of the second synchronization signal ss2 during the horizontal cycle period Th.

At least one of a pulse width, a number of pulses, and a pulse pattern of the first synchronization signal ss1 may be different from that of the second synchronization signal ss2. As an example, two among a pulse width, the number of pulses, and a pulse pattern of the first synchronization signal ss1 may be different from those of the second synchronization signal ss2. For example, a pulse width and the number of pulses of the first synchronization signal ss1 may be different from those of the second synchronization signal ss2. A pulse width and a pulse pattern of the first synchronization signal ss1 may be different from those of the second synchronization signal ss2. The number of pulses and a pulse pattern of the first synchronization signal ss1 may be different from those of the second synchronization signal ss2. However, example embodiments are not limited thereto, and the first synchronization signal ss1 may differ from the second synchronization signal ss2 in terms of a pulse width, the number of pulses, and a pulse pattern.

The host may transfer the synchronization signal ss to the display driving circuit through the auxiliary channel. In a normal mode NM, the host may transfer the synchronization signal ss to the display driving circuit. In the low power mode LPM, the host may transfer the synchronization signal ss to the display driving circuit.

The display driving circuit may receive the synchronization signal ss through the auxiliary channel. The display driving circuit may distinguish the first synchronization signal ss1 from the second synchronization signal ss2. In some example embodiments, during the horizontal cycle period Th, the display driving circuit may distinguish the first synchronization signal ss1 from the second synchronization signal ss2 based on a pulse pattern of the synchronization signal ss. For example, among the synchronization signals ss received through the auxiliary channel, during the horizontal cycle period Th, the display driving circuit may distinguish a first pulse pattern pp1 as the first synchronization signal ss1, and during the horizontal cycle period Th, the display driving circuit may distinguish a second pulse pattern pp2 as the second synchronization signal ss2.

The display driving circuit may receive the synchronization signal ss when the host is in a normal mode NM. When the host is in a low power mode LPM, the display driving circuit may receive the synchronization signal ss.

Figure 7:
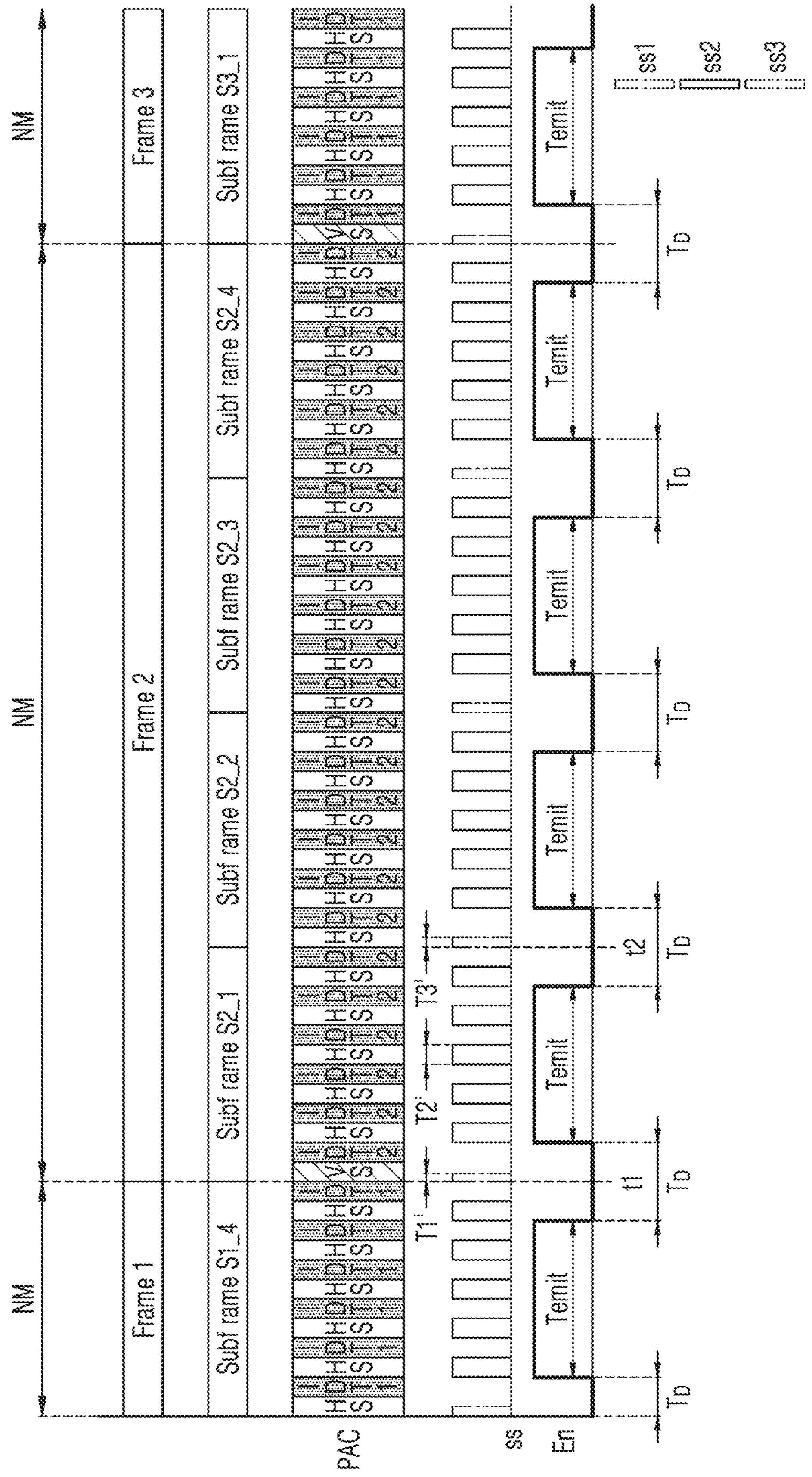
FIG. 7 is a diagram for describing an emission control signal according to some example embodiments.

FIG. 7 is a diagram for describing an emission control signal according to some example embodiments. Descriptions that overlap with the descriptions provided above are omitted.

Referring to FIG. 7, a host may generate image data IDT1, IDT2, and IDT3. The host may transfer a packet PAC to a display driving circuit through a main channel. The host may transfer the image data IDT1, IDT2, and IDT3 to the display driving circuit through the main channel.

The host may generate a synchronization signal ss. The synchronization signal ss may include a first synchronization signal ss1, a second synchronization signal ss2, and a third synchronization signal ss3. The third synchronizing signal ss3 may provide information about a point in time for controlling an emission time of pixels included in a display panel. The third synchronization signal ss3 may be an emission synchronization signal.

The host may generate the third synchronization signal ss3 corresponding to each sub-frame. One frame may include a plurality of sub-frames. For example, each frame may include four sub-frames. However, example embodiments are not limited thereto, and one frame may include various numbers of sub-frames, for example, eight or sixteen sub-frames. When one frame includes a plurality of sub-frames, the emission time of pixels included in the display panel may be controlled for each sub-frame. The host may generate the third synchronization signal ss3 to control the emission time of pixels for each sub-frame. In detail, the host may generate the third synchronization signal ss3 such that the display driving circuit controls an emission control signal En. The emission control signal En may control the emission time of pixels included in the display panel.

The host may differently generate at least one of a pulse width, the number of pulses, and a pulse pattern of each of the first synchronization signal ss1, the second synchronization signal ss2, and the third synchronization signal ss3. In some example embodiments, the host may generate the first synchronization signal ss1, the second synchronization signal ss2, and the third synchronization signal ss3 differently from each other. For example, a pulse width T1' of the first synchronization signal ss1, a pulse width T2' of the second synchronization signal ss2, and a pulse width T3' of the third synchronization signal ss3 may be different from one another. The host may generate the first synchronization signal ss1, the second synchronization signal ss2, and the third synchronization signal ss3 by adjusting the PWM of the synchronization signal ss.

The host may set a duty ratio of the first synchronization signal ss1 to be different from that of the second synchronization signal ss2. The host may set a duty ratio of the first synchronization signal ss1 to be different from that of the third synchronization signal ss3. The host may set a duty ratio of the second synchronization signal ss2 to be different from that of the third synchronization signal ss3. For example, the host may generate the first synchronization signal ss1 and the third synchronization signal ss3 such that the pulse width T1' of the first synchronization signal ss1 is the smallest, and the pulse width T3' of the third synchronization signal ss3 is greater than the pulse width T1' of the first synchronization signal ss1. The host may generate the second synchronization signal ss2 such that the pulse width T2' of the second synchronization signal ss2 is greater than the pulse width T3' of the third synchronization signal ss3. However, example embodiments are not limited thereto, and the host may generate the synchronization signal ss in various manners such that the first synchronization signal ss1, the second synchronization signal ss2, and the third synchronization signal ss3 are distinguished from one another.

The host may transfer the synchronization signal ss to the display driving circuit through the auxiliary channel. In a normal mode NM, the host may transfer the synchronization signal ss to the display driving circuit. In a low power mode LPM, the host may transfer the synchronization signal ss to the display driving circuit.

The display driving circuit may receive the synchronization signal ss from the host. The display driving circuit may receive the synchronization signal ss through the auxiliary channel. The display driving circuit may generate control signals for driving the display panel based on the synchronization signal ss received through the auxiliary channel.

The display driving circuit may distinguish the first synchronization signal ss1, the second synchronization signal ss2, and the third synchronization signal ss3 from one another. The display driving circuit may distinguish the first synchronization signal ss1, the second synchronization signal ss2, and the third synchronization signal ss3 from one another, based on at least one of a pulse width, the number of pulses, and a pulse pattern of the synchronization signal ss. In some example embodiments, the display driving circuit may distinguish the first synchronization signal ss1, the second synchronization signal ss2, and the third synchronization signal ss3 from one another, based on a pulse width of the synchronization signal ss. For example, the display driving circuit may distinguish a signal having a smallest pulse width among the synchronization signals ss received through the auxiliary channel, as the first synchronization signal ss1, and a signal having a larger pulse width than the first synchronization signal ss1 as the third synchronization signal ss3, and a signal having a larger pulse width than the third synchronization signal ss3, as the second synchronization signal ss2.

In some example embodiments, the display driving circuit may generate an emission control signal En for controlling an emission time of pixels of the display panel, based on the synchronization signal ss. The display driving circuit may generate the emission control signal En based on at least one of the first synchronization signal ss1 and the third synchronization signal ss3. The emission control signal En may adjust the emission time of pixels included in the display panel. When one frame includes a plurality of sub-frames, the emission time of pixels may be adjusted for each sub-frame.

An emission period of a pixel may be controlled based on the emission control signal En. When the emission control signal En is at an active level, a section with the active level may be an emission period Temit in which pixels emit light, and when the emission control signal En is at an inactive level, a section with inactive level may be a non-emission period TD in which emission of pixels is blocked. A section in which the emission control signal En is at a logic high level may be at an active level and may be the emission period Temit. A section in which the emission control signal En is at a logic low level may be at an inactive level and may be the non-emission period TD. However, example embodiments are not limited thereto, and a section in which the emission control signal En is at a logic low level may be the emission period Temit, and a section when in which the emission control signal En is at a logic high level may be the non-emission period Td.

During one frame, a luminance of the display panel may be adjusted by dividing the light emission control signal En into several pieces. During each sub-frame, the emission control signal En may be adjusted. Image data IDT1, IDT2, and IDT3 may start to be updated during the emission period Temit in each sub-frame. A section in which the emission control signal En is in an active state during a plurality of sub-frames included in one frame may be an emission period of the entire frame in which the plurality of sub-frames are included. For example, the emission period Temit of the second frame may be a sum of the emission periods Temit of a first sub-frame S2_1, a second sub-frame S2_2, and a third sub-frame S2_3.

The display driving circuit may generate the emission control signal En based on at least one of the first synchronization signal ss1 and the third synchronization signal ss3. The display driving circuit may control the emission control signal En for controlling the emission control signal En based on the first synchronization signal ss1 in the first sub-frame S2_1. The display driving circuit may control the emission control signal En during the first sub-frame S2_1 based on the first synchronization signal ss1. For example, by receiving the first synchronization signal ss1 from the first point in time t1, the display driving circuit may have determined a start point of the second frame, and control the emission control signal En in an active state after a certain period of time from the first point in time t1.

The display driving circuit may control the emission control signal En based on the third synchronization signal ss3 in the second sub-frame S2_2. The display driving circuit may control the emission control signal En during the second sub-frame S2_2 based on the third synchronization signal ss3. For example, the display driving circuit may receive the third synchronization signal ss3 from the second point in time t2 and control the emission control signal En in an active state after a certain period of time from the second point in time t2.

Figure 8:
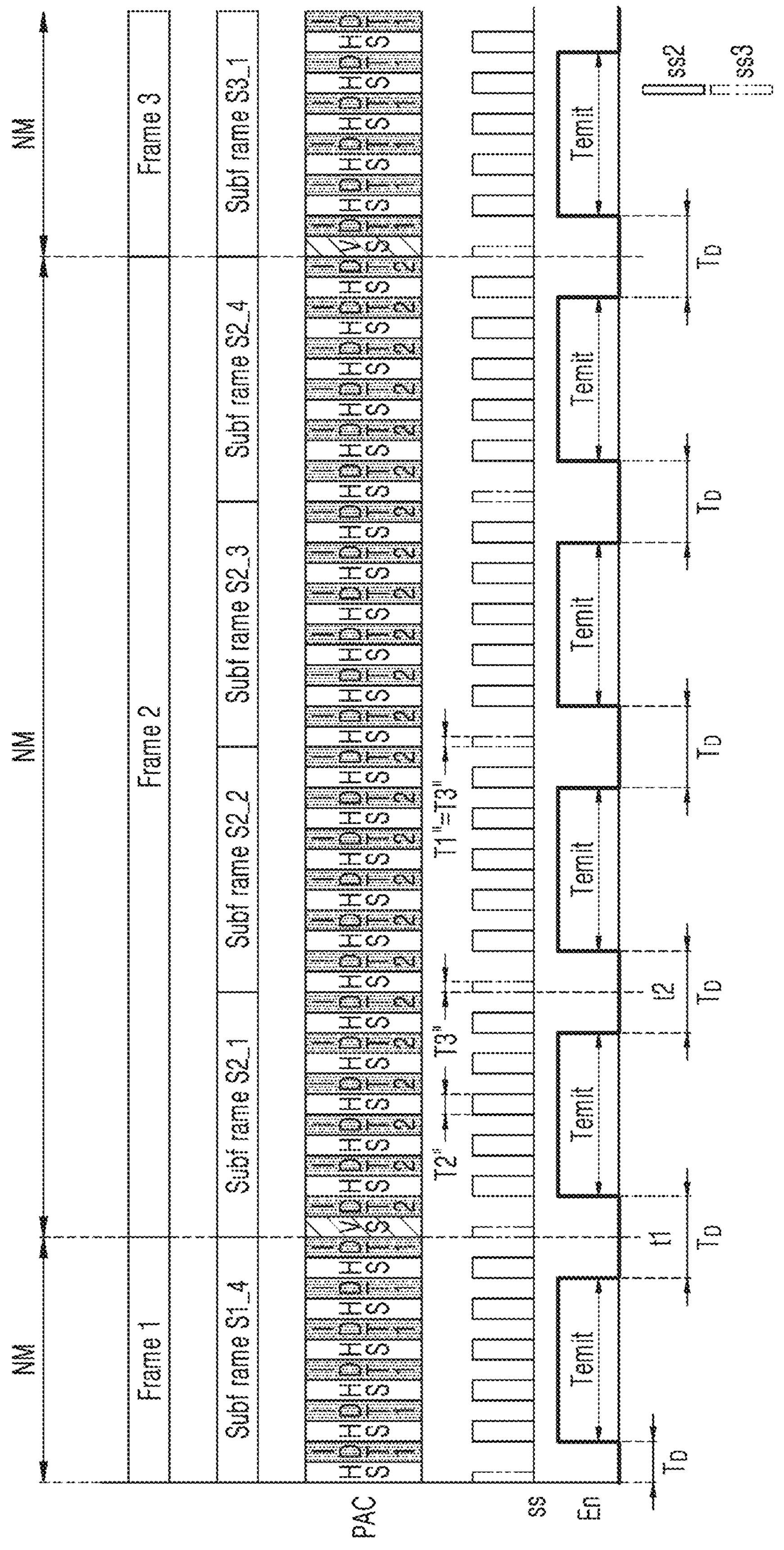
FIG. 8 is a diagram for describing an emission control signal according to some example embodiments.

FIG. 8 is a diagram for describing an emission control signal according to some example embodiments. Compared with FIG. 7, FIG. 8 is a diagram for describing that the first synchronization signal is identical to the third synchronization signal. Descriptions that overlap with the descriptions provided above are omitted.

The host may generate a synchronization signal ss. The synchronization signal ss may include a first synchronization signal ss1, a second synchronization signal ss2, and a third synchronization signal ss3. In some example embodiments, the first synchronization signal ss1 may be included in the third synchronization signal ss3. When the first synchronization signal ss1 is identical to the third synchronization signal ss3, the third synchronization signal ss3, which is also the first synchronization signal ss1 at the same time, may provide at least one of information about a start of a frame and information about a point in time for controlling an emission time of pixels. As the first synchronization signal ss1 is identical to the third synchronization signal ss3, a pulse width T1" of the first synchronization signal ss1 may be identical to a pulse width T3" of the third synchronization signal ss3. For convenience, hereinafter, the third synchronization signal ss3, which is the first synchronization signal ss1, will be referred to as the third synchronization signal ss3.

The host may generate third synchronization signals ss3 respectively corresponding to sub-frames. The host may generate at least one of a pulse width, the number of pulses, and a pulse pattern of the second synchronization signal ss2 differently from that of the third synchronization signal ss3. For example, a pulse width T2" of the second synchronization signal ss2 may be different from the pulse width T3" of the third synchronization signal ss3.

The host may set a duty ratio of the second synchronization signal ss2 to be different from that of the third synchronization signal ss3. For example, the host may generate the second synchronization signal ss2 such that the pulse width T2" of the second synchronization signal ss2 is greater than the pulse width T3" of the third synchronization signal ss3. However, example embodiments are not limited thereto, and the host may generate the synchronization signal ss in various manners such that the second synchronization signal ss2 and the third synchronization signal ss3 are distinguished from each other. The host may transfer the synchronization signal ss to the display driving circuit through the auxiliary channel.

The display driving circuit may receive the synchronization signal ss from the host. The display driving circuit may receive the synchronization signal ss through the auxiliary channel. The display driving circuit may generate control signals for driving the display panel based on the synchronization signal ss received through the auxiliary channel.

The display driving circuit may distinguish the second synchronization signal ss2 from the third synchronization signal ss3. The display driving circuit may distinguish the second synchronization signal ss2 from the third synchronization signal ss3 based on at least one of a pulse width, the number of pulses, and a pulse pattern of the synchronization signal ss. In some example embodiments, the display driving circuit may distinguish the second synchronization signal ss2 from the third synchronization signal ss3 based on a pulse width of the synchronization signal ss. For example, the display driving circuit may distinguish a signal having a relatively small pulse width among the synchronization signals ss received through the auxiliary channel, as the third synchronization signal ss3, and a signal having a larger pulse width than the third synchronization signal ss3 as the second synchronization signal ss2.

The display driving circuit may distinguish the first synchronization signal ss1 from the third synchronization signal ss3. In some example embodiments, the display driving circuit may distinguish the first synchronization signal ss1 from the third synchronization signal ss3 based on whether at least one of the image data IDT1, IDT2, and IDT3 and a synchronization packet is received through the main channel. For example, when the display driving circuit receives a vertical synchronization packet VS through the main channel from the first point in time t1 and receives the third synchronization signal ss3 through the auxiliary channel, the display driving circuit may have determined that the third synchronization signal ss3 is a signal that also has the meaning as the first synchronization signal. When the display driving circuit has not received the vertical synchronization packet VS through the main channel from the second point in time t2, but receives the third synchronization signal ss3 through the auxiliary channel, the display driving circuit may have determined that the third synchronization signal ss3 has only the meaning as the third synchronization signal ss3.

Figure 9:
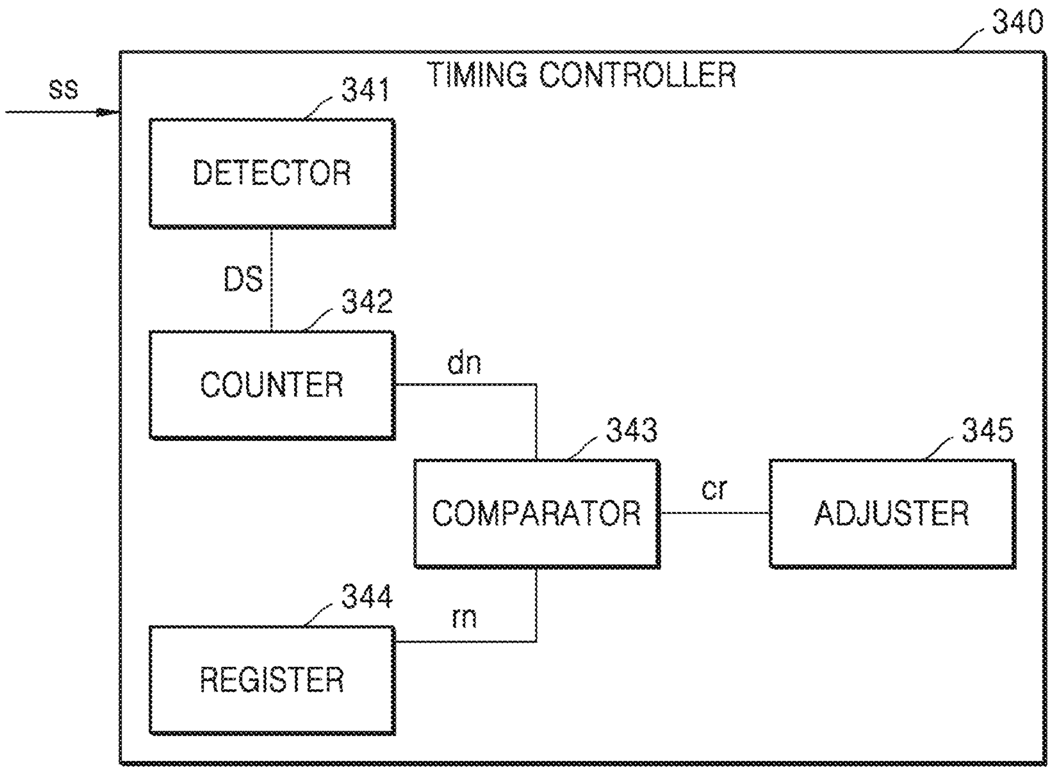
FIG. 9 is a diagram for describing a timing controller according to some example embodiments.

FIG. 9 is a diagram for describing a timing controller according to some example embodiments. As the timing controller 340 of FIG. 9 corresponds to the timing controller 340 of FIG. 1, repeated descriptions thereof are omitted.

Referring to FIG. 9, the timing controller 340 may include a detector circuit or detector 341, a counter circuit or counter 342, a comparator circuit or comparator 343, a register 344, and an adjuster circuit or adjuster 345. The timing controller 340 may receive a synchronization signal ss from the host through the auxiliary channel. The timing controller 340 may generate control signals for driving a display panel, based on the synchronization signal ss.

The detector 341 may distinguish the synchronization signal ss. When the synchronization signal ss includes a first synchronization signal and a second synchronization signal, the detector 341 may distinguish the first synchronization signal from the second synchronization signal. The detector 341 may distinguish the first synchronization signal from the second synchronization signal, based on at least one of a pulse width, the number of pulses, and a pulse pattern of the synchronization signal ss. In some example embodiments, the detector 341 may distinguish the first synchronization signal from the second synchronization signal, based on a pulse width. For example, among the synchronization signal ss, the detector 341 may distinguish a signal having a relatively small pulse width as the first synchronization signal and distinguish a signal having a larger pulse width than the first synchronization signal, as the second synchronization signal.

When the synchronization signal ss includes a first synchronization signal, a second synchronization signal, and a third synchronization signal, the detector 341 may distinguish the first synchronization signal, the second synchronization signal, and the third synchronization signal from one another. The detector 341 may distinguish the first synchronization signal, the second synchronization signal, and the third synchronization signal from one another based on at least one of the pulse width, the number of pulses, and the pulse pattern of the synchronization signal ss. In some example embodiments, the detector 341 may distinguish the first synchronization signal, the second synchronization signal, and the third synchronization signal from one another based on a pulse width. For example, among the synchronization signal ss, the detector 341 may distinguish a signal having a smallest pulse width as the first synchronization signal, distinguish a signal having a larger pulse width than the first synchronization signal, as the third synchronization signal, and distinguish a signal having a larger pulse width than the third synchronization signal, as the second synchronization signal.

The synchronization signal ss may include the second synchronization signal and the third synchronization signal. The detector 341 may distinguish the second synchronization signal from the third synchronization signal based on at least one of the pulse width, the number of pulses, and the pulse pattern of the synchronization signal ss. When the first synchronization signal is included in the third synchronization signal, the detector 341 may distinguish the first synchronization signal from the third synchronization signal. The detector 341 may distinguish the first synchronization signal ss1 from the third synchronization signal ss3 based on whether at least one of image data and a synchronization packet is received through the main channel.

The detector 341 may transfer a distinguishment signal DS to the counter 342 when the first synchronization signal is distinguished. The counter 342 may be reset upon receiving the distinguishment signal DS. However, example embodiments are not limited thereto, and the detector 341 may transfer the distinguishment signal DS to the counter 342 when the third synchronization signal ss3 is distinguished.

The counter 342 may count the number of detections dn. The number of detections dn may refer to a number of second synchronization signals received between a first reception time when the first synchronization signal is received and a second reception time when the first synchronization signal is received after the first reception time. When the first synchronization signal is distinguished, the counter 342 may be reset. The counter 342 may be reset at the first reception time and then reset at the second reception time. The counter 342 may count a number of second synchronization signals received between reset points.

The counter 342 may be reset according to distinguishing of the third synchronization signal. The counter 342 may count a number of second synchronization signals received between a third reception time when a third synchronization signal is received and a fourth reception time when a next third synchronization signal is received. The number of detections may refer to the number of second synchronization signals received between the third reception time and the fourth reception time. When the first synchronization signal is distinguished, the counter 342 may be reset. The counter 342 may count a number of second synchronization signals received between reset points.

The comparator 343 may compare the number of detections to a reference number. The reference number may be or may be based on a value such as a dynamically determined (or, alternatively, preset) in the timing controller 340 and/or a value stored in the register 344. The reference number may refer to a number of second synchronization signals received between reset points when no error occurs while the timing controller 340 receives a synchronization signal ss from the host. The comparator 343 may compare whether the number of detections is greater than the reference number. The comparator 343 may compare whether the number of detections is less than the reference number.

The adjuster 345 may determine whether at least one error has occurred in a process of receiving the synchronization signal ss, based on a comparison result cr of the comparator 343. In some example embodiments, the adjuster 345 may determine, based on the comparison result cr, whether at least one error has occurred in the process of receiving at least one of a first synchronization signal and a second synchronization signal. The comparison result cr may include a result of comparing the number of detections to the reference number and include a difference between the number of detections and the reference number.

The adjuster 345 may determine that no error has occurred in the process of receiving the synchronization signal ss, when the number of detections matches the reference number. The adjuster 345 may determine that at least one error has occurred in the process of receiving the synchronization signal ss, when the number of detections and the reference number do not match.

In some example embodiments, the adjuster 345 may generate control signals CS by reflecting the comparison result cr. The adjuster 345 may control an emission control signal when it is determined that at least one error has occurred in the process of receiving the synchronization signal ss. The adjuster 345 may control an emission time of pixels, when it is determined that at least one error has occurred in the process of receiving the synchronization signal ss.

The adjuster 345 may control the emission time of pixels based on the difference between the number of detections and the reference number. A method of controlling the emission time of pixels based on the difference between the number of detections and the reference number will be described in detail with reference to FIG. 10.

In some example embodiments, when the adjuster 345 determines that at least one error has occurred in the process of receiving the synchronization signal ss, the adjuster 345 may transfer a determination result to the host. The determination result may include the comparison result cr. The host may generate a synchronization signal ss by reflecting the determination result. The timing controller 340 may transmit the determination result to the host in various manners. For example, the display driving circuit may transfer the determination result to the host through a separate interrupt pin. However, example embodiments are not limited thereto, and the display driving circuit may transfer the determination result to the host through the main channel or through the auxiliary channel.

The adjuster 345 may determine whether to transfer the determination result to the host according to the difference between the number of detections and the reference number. In some example embodiments, the adjuster 345 may deliver the determination result to the host when the difference between the number of detections and the reference number is greater than or equal to a threshold value. The adjuster 345 may not transfer the determination result to the host when the difference between the number of detections and the reference number is less than a threshold value. The adjuster 345 may control the emission time of pixels when the difference between the number of detections and the reference number is less than a threshold value. If the difference between the number of detections and the reference number is less than a threshold value, the adjuster 345 may control the emission time of pixels independently of the host.

Figure 10:
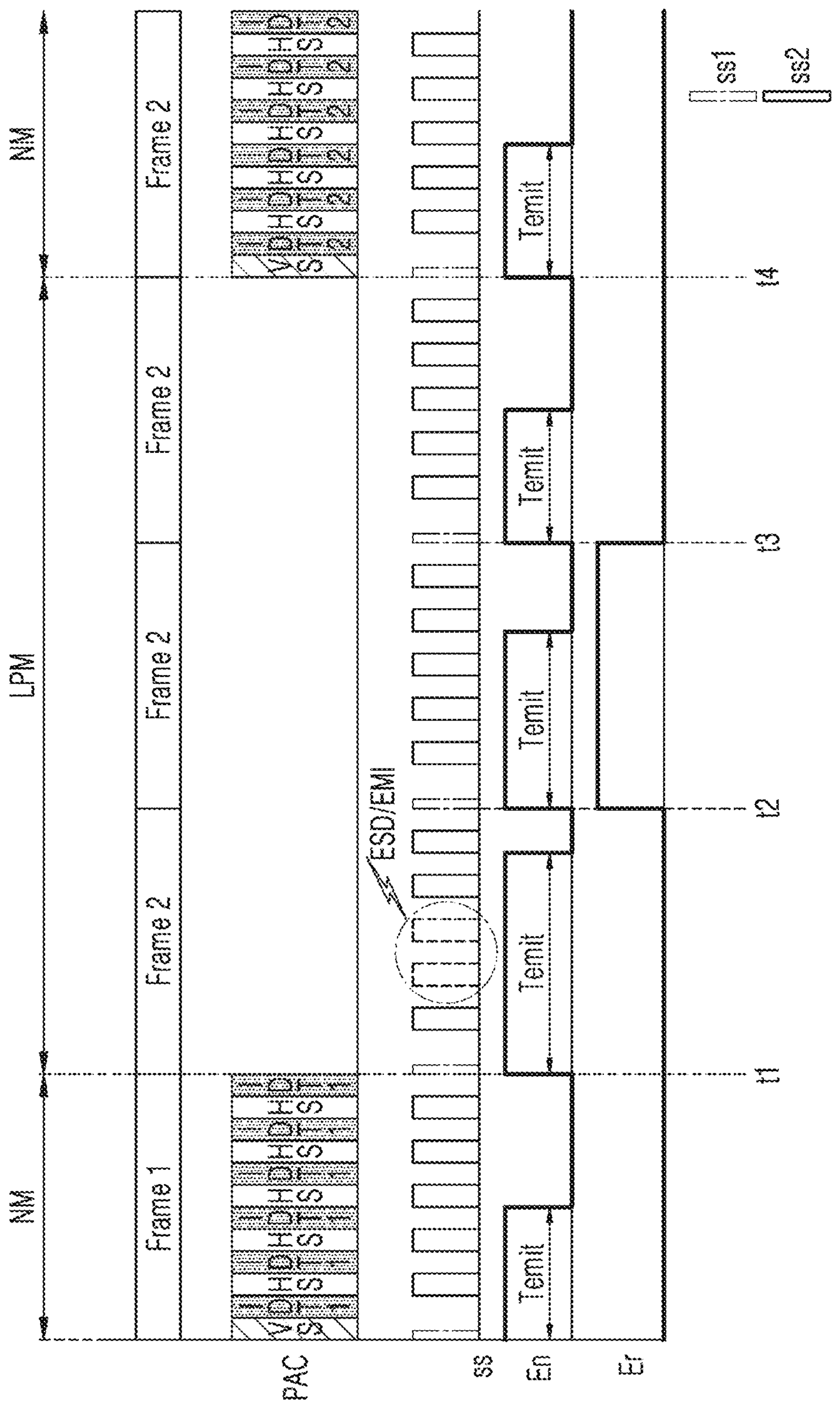
FIG. 10 is a diagram for describing a method of controlling an emission control signal, according to some example embodiments.

FIG. 10 is a diagram for describing a method of controlling an emission control signal, according to some example embodiments. In detail, the timing controller 340 of FIG. 9 may control the emission control signal En. For convenience of description, the description is based on the assumption that the synchronization signal ss includes the first synchronization signal ss1 and the second synchronization signal ss2. Descriptions that overlap with the descriptions provided above are omitted.

The timing controller may distinguish the first synchronization signal ss1 from the second synchronization signal ss2. The timing controller may distinguish the first synchronization signal ss1 from the second synchronization signal ss2 based on at least one of a pulse width, the number of pulses, and a pulse pattern of the synchronization signal ss. For example, among the synchronization signal ss, the timing controller may distinguish a signal having a relatively small pulse width as the first synchronization signal ss1 and distinguish a signal having a larger pulse width than the first synchronization signal ss1, as the second synchronization signal ss2.

The timing controller may count the number of detections. The number of detections may refer to a number of second synchronization signals ss2 received between a first reception time when the first synchronization signal ss1 is received and a second reception time when the first synchronization signal ss1 is received after the first reception time. The number of detections between the point in time t1 and the point in time t2 may be three. The number of detections between the point in time t2 and the point in time t3 may be five.

The timing controller may determine whether at least one error has occurred in a process of receiving the synchronization signal ss, based on the number of detections. The timing controller may compare the number of detections to a reference number. The timing controller may compare whether the number of detections matches the reference number. At least one error may occur due to electrical interference such as electrostatic discharge (ESD) and electromagnetic interference (EMI) while the synchronization signal ss is transferred from the host to the display driving circuit. If at least one error occurs in the process of receiving the synchronization signal ss, the synchronization signal ss generated from the host may not be transferred properly, and the number of detections may differ from the reference number.

When the number of detections matches the reference number, the timing controller may determine that no error has occurred in the process of receiving the synchronization signal ss. For example, when the reference number is five, since the number of detections between the point in time t2 and the point in time t3 is five, the timing controller may determine that no error has occurred in the process of receiving the synchronization signal between the point in time t2 and the point in time t3.

When the number of detections and the reference number do not match, the timing controller may determine that at least one error has occurred in the process of receiving the synchronization signal ss. For example, when the reference number is five, since the number of detections between the point in time t1 and the point in time t2 is three, the timing controller may determine that at least one error has occurred in the process of receiving the synchronization signal between the point in time t1 and the point in time t2.

In some example embodiments, when it is determined that at least one error has occurred in the process of receiving the synchronization signal ss, the timing controller may control the emission time of pixels included in the display panel, based on the difference between the number of detections and the reference number. In detail, the timing controller may generate control signals based on the difference between the number of detections and the reference number, and the emission control signal may be controlled based on the control signal.

The timing controller may control an emission control signals of frames following a frame in which the error has occurred, based on the difference between the reference number and the number of detections. For example, it may be assumed that the timing controller controls the emission control signal En in an active state while receiving three second synchronization signals ss2 in one frame. Since at least one error has occurred between the point in time t1 and the point in time t2, the emission control signal En may be in an active state for a longer period of time than when no error occurs.

The timing controller may control the emission control signal between the point in time t1 and the point in time t2 based on the difference between the reference number and the number of detections between the point in time t2 and the point in time t3. For example, at least one error may occur between the point in time t1 and the point in time t2, and the difference between the reference number and the number of detections may be two. The timing controller may control the emission control signal in an active state, while receiving four second synchronization signals ss2 between the point in time t2 and the point in time t3. The emission control signal En may be restored to an active state at the point in time t3 and at a point time t4, while receiving three second synchronization signals ss2. Even if one or more errors occurs in the process of receiving the synchronization signal ss due to electrical interference or the like, by recovering the error, by the display driving circuit, image quality problems, such as flicker, may be addressed.

In some example embodiments, the timing controller may transmit an error signal Er to the host, when it is determined that at least one error has occurred while receiving the synchronization signal ss. The error signal Er may include a determination result. Since at least one error has occurred between the point in time t1 and the point in time t2, the timing controller may transmit the error signal Er at the point in time t2 and the point in time t3 corresponding to a next frame. FIG. 10 shows that the error signal Er is at an active level during the point in time t2 and the point in time t3, but is not limited thereto, and the error signal Er may be implemented in various manners.

Figure 11:
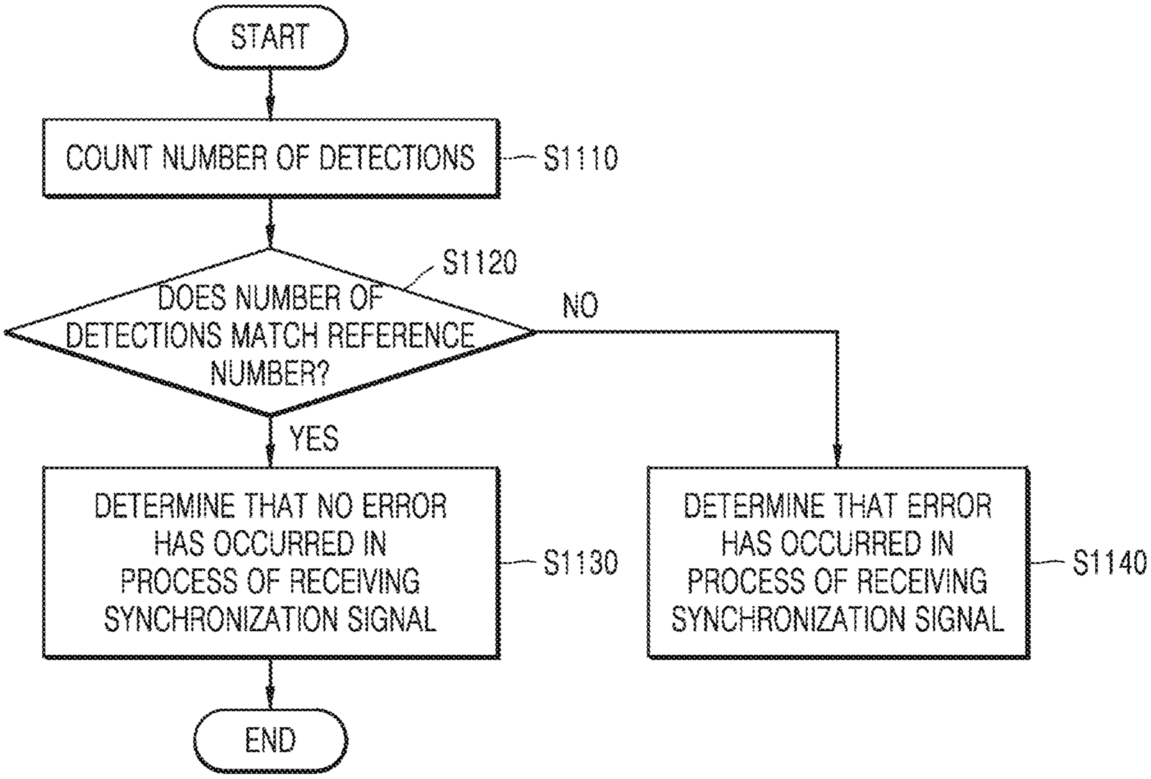
FIG. 11 is a flowchart of an operating method of a display driving circuit, according to some example embodiments.

FIG. 11 is a flowchart of an operating method of a display driving circuit, according to some example embodiments. In detail, FIG. 11 is a flowchart of a method of determining whether at least one error has occurred while a display driving circuit is receiving a synchronization signal. Descriptions that overlap with the descriptions provided above are omitted.

In operation S1110, the display driving circuit may count a number of detections. The display driving circuit may distinguish at least one of the first synchronization signal, the third synchronization signal, and the second synchronization signal based on at least one of a pulse width, the number of pulses, and a pulse pattern of the synchronization signal. The number of detections may refer to a number of second synchronization signals received between a first reception time when the first synchronization signal is received and a second reception time when the first synchronization signal is received after the first reception time. The number of detections may refer to a number of second synchronization signals received between a point time, which is a third reception time at which the third synchronization signal is received, and a point in time, which is a fourth reception time at which the third synchronization signal is received after the third reception time.

The display driving circuit may determine whether at least one error has occurred in a process of receiving a synchronization signal, based on the number of detections. In operation S1120, the display driving circuit may determine whether the number of detections matches the reference number. The display driving circuit may compare whether the number of detections matches the reference number. At least one error may occur due to electrical interference while a synchronization signal is transferred from the host to the display driving circuit. If at least one error occurs in the process of receiving the synchronization signal ss, the synchronization signal ss generated from the host may not be transferred properly, and the number of detections may differ from the reference number. The display driving circuit may perform operation S1130 when the number of detections matches the reference number, and perform operation S1140 if the number of detections does not match the reference number.

In operation S1130, the display driving circuit may determine that no error has occurred in the process of receiving the synchronization signal when the number of detections matches the reference number. For example, when the reference number is five and the number of detections is five, the display driving circuit may determine that no error has occurred in the process of receiving the synchronization signal.

In operation S1140, when the number of detections and the reference number do not match, the display driving circuit may determine that at least one error has occurred in the process of receiving the synchronization signal ss. For example, when the reference number is five and the number of detections is three, the display driving circuit may determine that at least one error has occurred in the process of receiving the synchronization signal.

Figure 12:
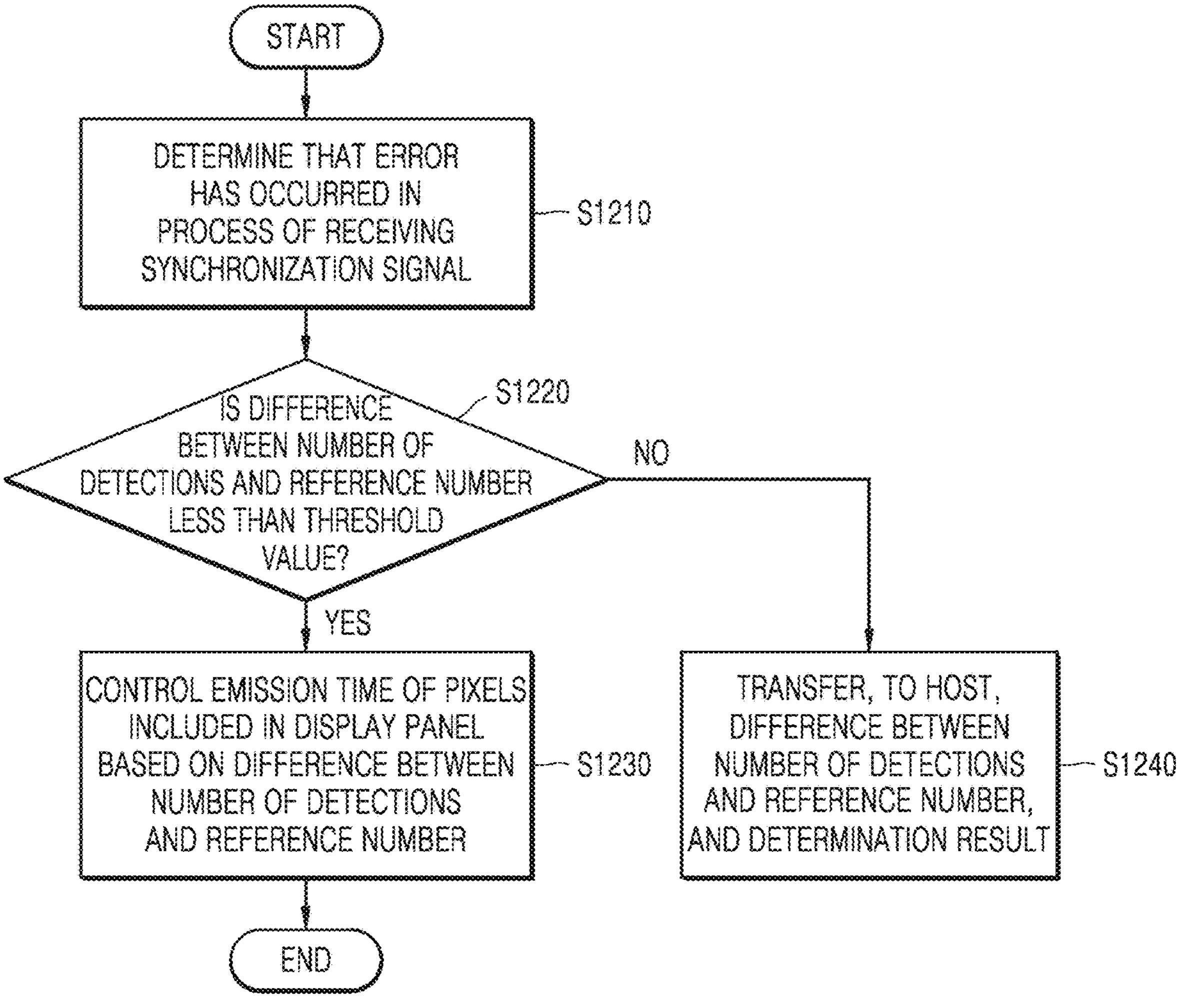
FIG. 12 is a flowchart of an operating method performed when it is determined that at least one error has occurred while a display driving circuit is receiving a synchronization signal, according to some example embodiments.

FIG. 12 is a flowchart of an operating method performed when it is determined that at least one error has occurred while a display driving circuit receives a synchronization signal, according to some example embodiments. In detail, operation S1140 of FIG. 11 may correspond to operation S1210 of FIG. 12. Descriptions that overlap with the descriptions provided above are omitted.

In operation S1210, the display driving circuit may determine that at least one error has occurred in a process of receiving a synchronization signal.

The display driving circuit may determine whether to transfer a determination result to the host, according to a difference between the number of detections and the reference number. In operation S1220, the display driving circuit may determine whether the difference between the number of detections and the reference number is less than a threshold value. The threshold value may refer to a number of second synchronization signals during a certain period for determining whether to transfer the determination result to the host. The display driving circuit may perform operation S1230 when the difference between the number of detections and the reference number is less than the threshold value, and perform operation S1240 when the difference between the number of detections and the reference number is greater than or equal to the threshold value.

In operation S1230, when the difference between the number of detections and the reference number is less than the threshold value, the display driving circuit may control the emission time of pixels included in the display panel based on the difference between the number of detections and the reference number. In some example embodiments, the display driving circuit may control an emission control signals of frames following a frame in which the error has occurred, based on the difference between the reference number and the number of detections. For example, the timing controller may control the emission control signal of the second frame, based on a difference between the number of detections of frames and the reference number of frames. When the difference between the number of detections and the reference number is relatively small, the display driving circuit may recover the error by controlling the emission time of pixels. Accordingly, the quality problem of the display panel may be improved.

In operation S1240, when the difference between the number of detections and the reference number is equal to or greater than the threshold value, the display driving circuit may transfer, to the host, the difference between the number of detections and the reference number and the determination result. The display driving circuit may transfer, to the host, a determination result indicating that at least one error has occurred. The display driving circuit may transfer the determination result to the host in various manners. For example, the display driving circuit may transfer the determination result to the host through a separate interrupt pin. However, a method in which the display driving circuit transfers the determination result and the difference between the number of detections and the reference number to the host is not limited thereto. The host may generate a synchronization signal by reflecting the determination result. In some example embodiments, the display driving circuit may transfer, to the host, a determination result indicating that at least one error has occurred, and the display driving circuit and the host may recover at least one error by controlling the emission time of pixels.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been particularly shown and described with reference to embodiments thereof, it will be understood that various changes in form and details may be made therein without departing from the spirit and scope of the following claims. Furthermore example embodiments are not necessarily mutually exclusive with one another. For example, some example embodiments may include one or more features described with reference to one or more figures, and may also include one or more other features described with reference to one or more other figures.

What is claimed is:

1. A display system comprising:

a host configured to transfer image data respectively corresponding to a plurality of frames through a main channel, and to transfer a synchronization signal that synchronizes a clock signal of the host with a clock signal of the display driving circuit, the synchronization signal transferred through an auxiliary channel;

a display panel configured to display the image data; and a display driving circuit configured to generate control signals driving the display panel, based on the synchronization signal received through the auxiliary channel, wherein the host is configured to transfer the synchronization signal that includes a first synchronization signal and a second synchronization signal that is different from the first synchronization signal, to the display driving circuit, through the auxiliary channel.

2. The display system of claim 1, wherein at least one of a pulse width, a number of pulses, and a pulse pattern of the first synchronization signal is different from a respective one of the second synchronization signal.

3. The display system of claim 1, wherein, in response to at least one of the plurality of frames being in a low power mode, the display driving circuit does not receive the image data through the main channel during the frame in the low power mode, but receives the synchronization signal through the auxiliary channel.

4. The display system of claim 1, wherein each of the plurality of frames comprises a plurality of sub-frames, and the host is configured to generate third synchronization signals respectively corresponding to the plurality of sub-frames, and to transfer, to the display driving circuit, the third synchronization signal through the auxiliary channel.

5. The display system of claim 4, wherein the display driving circuit is configured to generate the control signal controlling an emission time of pixels of the display panel, based on the third synchronization signal.

6. The display system of claim 4, wherein at least one of a pulse width, a number of pulses, and a pulse pattern of each of the first synchronization signal, the second synchronization signal, and the third synchronization signal is different from respective others thereof.

7. The display system of claim 1, wherein the display driving circuit is configured to determine whether at least one error has occurred in a process of receiving the synchronization signal, based on a number of second synchronization signals received between a first reception time corresponding to the first synchronization signal being received and a second reception time corresponding to the first synchronization signal being received after the first reception time.

8. The display system of claim 7, wherein, in response to the number of second synchronization signals received between the first reception time and the second reception time matching a reference number stored in the display driving circuit, the display driving circuit is configured to determine that no error occurred in the process of receiving the synchronization signal, and in response to the number of second synchronization signals received between the first reception time and the second reception time not matching the reference number, the display driving circuit is configured to determine that at least one error has occurred in the process of receiving the synchronization signal.

9. The display system of claim 8, wherein, in response to the display driving circuit determining that at least one error has occurred in the process of receiving the synchronization signal, the display driving circuit is configured to control an emission time of pixels included in the display panel, based on a difference between the reference number and a number of second synchronization signals received between the first reception time and the second reception time.

10. The display system of claim 8, wherein, in response to the display driving circuit determining that at least one error has occurred in the process of receiving the synchronization signal, the display driving circuit is configured to transfer a determination result to the host.

11. The display system of claim 8, wherein, in response to the display driving circuit determining that at least one error has occurred in the process of receiving the synchronization signal, and in response to the difference between the number of second synchronization signals received between the first reception time and the second reception time and the reference number, being less than a threshold value, the display driving circuit is configured to control an emission time of pixels included in the display panel, based on the difference, and in response to the difference being greater than or equal to the threshold value, the display driving circuit transfers the difference and the determination result to the host.

12. A display driving circuit configured to operate in a normal mode of a video mode and a low power mode, the display driving circuit comprising:

an interface configured to receive, in the normal mode, image data from a host through a main channel, and to receive, through an auxiliary channel in the normal mode and the low power mode, a first synchronization signal and a second synchronization signal that is different from the first synchronization signal;

a data processor configured to receive the image data from the interface and convert the image data; and a timing controller configured to generate control signals driving a display panel based on the first synchronization signal and on the second synchronization signal.

13. The display driving circuit of claim 12, wherein the timing controller comprises:

a detector configured to distinguish the first synchronization signal from the second synchronization signal;

a counter configured to count a number of detections, which is a number of second synchronization signals received between a first reception time corresponding to the first synchronization signal being received and a second reception time corresponding to the first synchronization signal being received after the first reception time;

a comparator configured to compare the number of detections to a reference number; and an adjuster configured to determine whether at least one error has occurred in a process of receiving at least one of the first synchronization signal and the second synchronization signal, based on a comparison result of the comparator.

14. The display driving circuit of claim 13, wherein, in response to determining that at least one error has occurred in the process of receiving at least one of the first synchronization signal and the second synchronization signal, the adjuster is configured to control an emission time of pixels included in the display panel based on a difference between the number of detections and the reference number.

15. The display driving circuit of claim 13, wherein, in response to determining that at least one error has occurred in the process of receiving at least one of the first synchronization signal and the second synchronization signal, the adjuster is configured to transfer a determination result to the host.

16. The display driving circuit of claim 12, wherein the timing controller is configured to receive a third synchronization signal transferred from the host to the interface through the auxiliary channel, and at least one of a pulse width, a number of pulses, and a pulse pattern of each of the first synchronization signal, the second synchronization signal, and the third synchronization signal is different from respective others thereof.

17. The display driving circuit of claim 16, wherein the timing controller comprises:

a detector configured to distinguish at least one of the first synchronization signal, the second synchronization signal, and the third synchronization signal;

a counter configured to count a number of detections, which is a number of second synchronization signals received between a third reception time corresponding to the third synchronization signal being received and a fourth reception time corresponding to the third synchronization signal being received after the third reception time;

a comparator configured to compare the number of detections to a reference number; and an adjuster configured to determine whether at least one error has occurred in a process of receiving at least one of the first synchronization signal, the second synchronization signal, and the third synchronization signal, based on a comparison result of the comparator.

18. The display driving circuit of claim 12, wherein the display driving circuit is configured to drive a low-temperature polycrystalline oxide (LTPO) display panel.

19. A host comprising:

an interface configured to transfer image data to a display driving circuit through a main channel and to transfer a synchronization signal to the display driving circuit through an auxiliary channel;

a display processor configured to generate the image data; and a sync generator configured to generate the synchronization signal, wherein the sync generator is configured to generate an emission synchronization signal and a horizontal synchronization signal, the emission synchronization signal providing information about a time for controlling an emission time of pixels included in a display panel driven by the display driving circuit.

20. The host of claim 19, wherein the sync generator is configured to generates at least one of a pulse width, a number of pulses, and a pulse pattern of the emission synchronization signal differently from that of the horizontal synchronization signal.

* * * * *